(12) United States Patent
Nash et al.

(10) Patent No.: US 8,872,847 B2
(45) Date of Patent: Oct. 28, 2014

(54) ARCHITECTURES AND METHODS FOR CREATING AND REPRESENTING TIME-DEPENDENT IMAGERY

(75) Inventors: Reuel William Nash, Austin, TX (US); Christopher S. Co, San Jose, CA (US); Andrew Kirmse, Redwood City, CA (US)

(73) Assignee: Google Inc., Mountain View, CA (US)

( * ) Notice: Subject to any disclaimer, the term of this patent is extended or adjusted under 35 U.S.C. 154(b) by 661 days.

(21) Appl. No.: 12/878,436

(22) Filed: Sep. 9, 2010

(65) Prior Publication Data

US 2011/0007094 A1 Jan. 13, 2011

Related U.S. Application Data

(63) Continuation-in-part of application No. 12/231,290, filed on Aug. 28, 2008, now Pat. No. 8,077,918.

(51) Int. Cl.
*G09G 5/00* (2006.01)
*G06T 17/00* (2006.01)
*G06K 9/36* (2006.01)
*G06F 17/30* (2006.01)

(52) U.S. Cl.
CPC ...... *G06F 17/30244* (2013.01); *G06F 17/3028* (2013.01); *G06F 17/30241* (2013.01); *G06F 17/30247* (2013.01); *G06F 17/30265* (2013.01)
USPC ..... 345/629; 345/428; 382/240; 707/E17.018

(58) Field of Classification Search
CPC .................. G06F 17/30241; G06F 17/30265; G06F 17/30247; G06F 17/3028; G06F 17/30244; G06T 2207/10032

USPC ............ 345/426, 629; 382/240; 707/E17.018
See application file for complete search history.

(56) References Cited

U.S. PATENT DOCUMENTS 5,912,165 A 6/1999 Cabib et al.
6,075,595 A 6/2000 Malinen
(Continued)

FOREIGN PATENT DOCUMENTS

EP 1703426 A1 9/2006

OTHER PUBLICATIONS

Gail Langran, Nicholas R. Chrisman: "A Framework for temporal Geographic Information", University of Washington Cartographica, vol. 25, No. 3, Dec. 31, 1988, pp. 1-14, Retrieved from the Internet: URL:http://www.unigis.ac.at/fernstudien/unigis_professional/lehrgangs_cd_1.../module//modul2/Temporal%20Geographic%20Information.pdf.

(Continued)

*Primary Examiner* — Jeffrey Chow
(74) *Attorney, Agent, or Firm* — Lerner, David, Littenberg, Krumholz & Mentlik, LLP

(57) ABSTRACT

The present invention pertains to geographical image processing of time-dependent imagery. Various assets acquired at different times are stored and processing according to acquisition date in order to generate one or more image tiles for a geographical region of interest. The different image tiles are sorted based on asset acquisition date. Multiple image tiles for the same region of interest may be available. In response to a user request for imagery as of a certain date, one or more image tiles associated with assets from prior to that date are used to generate a time-based geographical image for the user.

19 Claims, 22 Drawing Sheets

(56) References Cited

U.S. PATENT DOCUMENTS

| | | | |
|---|---|---|---|
| 6,373,568 | B1 | 4/2002 | Miller et al. |
| 7,009,699 | B2 | 3/2006 | Wolleschensky et al. |
| 7,225,207 | B1 | 5/2007 | Ohazama et al. |
| 7,353,114 | B1 | 4/2008 | Rohlf et al. |
| RE41,428 | E * | 7/2010 | Mayer et al. ............. 345/428 |
| 8,103,081 | B2 | 1/2012 | Gossage et al. |
| 8,339,394 | B1 | 12/2012 | Lininger |
| 2001/0014185 | A1* | 8/2001 | Chitradon et al. ......... 382/305 |
| 2003/0142523 | A1* | 7/2003 | Biacs ........................... 365/1 |
| 2006/0041591 | A1 | 2/2006 | Rhoads |
| 2006/0181546 | A1 | 8/2006 | Jung et al. |
| 2006/0208926 | A1* | 9/2006 | Poor et al. ............... 340/995.1 |
| 2007/0096945 | A1 | 5/2007 | Rasmussen et al. |
| 2007/0136259 | A1 | 6/2007 | Dorfman et al. |
| 2007/0250477 | A1 | 10/2007 | Bailly |
| 2008/0016472 | A1 | 1/2008 | Rohlf et al. |
| 2008/0077597 | A1* | 3/2008 | Butler .......................... 707/10 |
| 2008/0158366 | A1 | 7/2008 | Jung et al. |
| 2008/0174593 | A1 | 7/2008 | Ham et al. |
| 2009/0063424 | A1* | 3/2009 | Iwamura et al. ............... 707/3 |
| 2009/0303251 | A1* | 12/2009 | Balogh et al. .............. 345/632 |

OTHER PUBLICATIONS

European Examination Report for Application No. 09810353.4 dated Oct. 18, 2012.

Conti et al., "DentroTrento—A virtual Walk Across history", 2006, pp. 318-321.

Naval, "Three-Dimensional Documentation of Complex Heritage Structures", Interpretive Enviornments, Apr.-Jun. 2000, pp. 52-55.

Magnenat-Thalmann et al., "Real-Time Animation of Ancient Roman Sites", 2006, pp. 19-30.

Vlahakis et al., "Archeoguide: An Augmented Reality Guide for Archaeological Sites", IEEE Computer Graphics and Applications, Sep./Oct. 2002, pp. 52-60.

Potmesil M., "Maps alive: Viewing geospacial information on the WWW", Computer Systems and ISDN Systems, North Holland Publishing, Amsterdam, NL, vol. 29, No. 8-13, Sep. 1, 1997, pp. 1327-1342, XP004095328.

Nan L. et al., "A spatial-temporal system for dynamic cadastral management," Journal of Environmental Management, Academic Press, London, GB, vol. 78, No. 4, Mar. 1, 2006, pp. 373-381.

Rocchini D. et al., "Landscape change and the dynamics of open formations in a natural reserve," Landscape and urban Planning, Elsevier, vol. 77, No. 1-2, Jun. 15, 2006, pp. 167-177.

The extended European search report, Application No. EP 09 81 0353.4, PCT/US2009004817, mail date, Dec. 5, 2011.

Wu, et al, "Automatic Alignment of Large-scale Aerial Rasters to Road-maps" Proceedings of the 15th international Symposium on Advances in Geographic information Systems, 2007.

Barclay, et al., "Microsoft TerraServer: A Spatial Data Warehouse", 2005.

Bauman, "Raster Databases", 2007.

Bhagavathy et al., "Modeling and Detection of Geospatial Objects Using Texture Motifs" 3706 IEEE Transactions on Geoscience and Remote Sensing. vol. 44, No. 12, Dec. 2006.

Ghemawat, et al. "The Google File System", 2003.

International Search Report, PCT/US09/04817, mailed Oct. 8, 2009.

http://ieeexplore.ieee.org/search retrieved from the Internet on Sep. 7, 2010.

European Office Action for Application No. 09810353 dated Oct. 9, 2013.

* cited by examiner

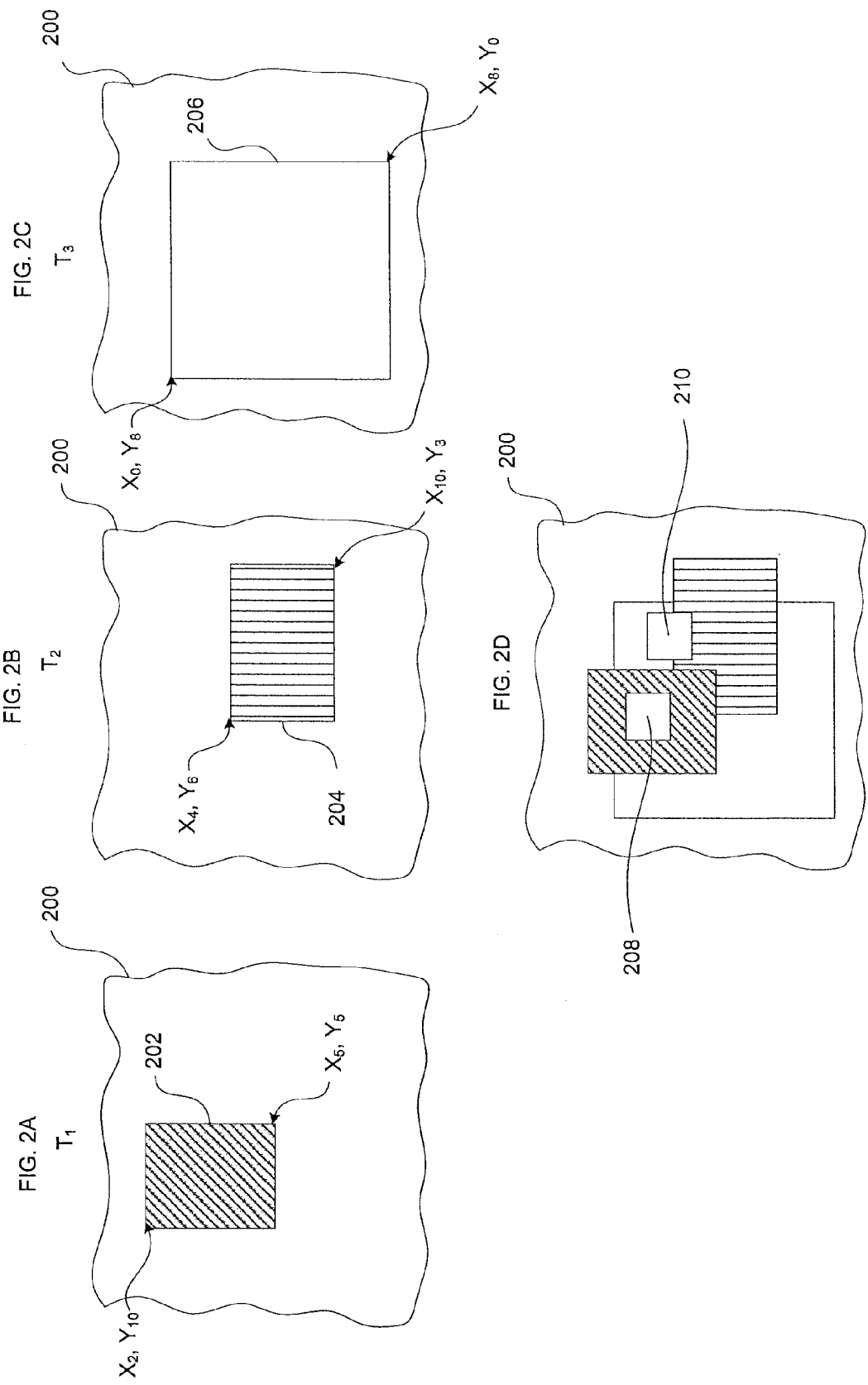

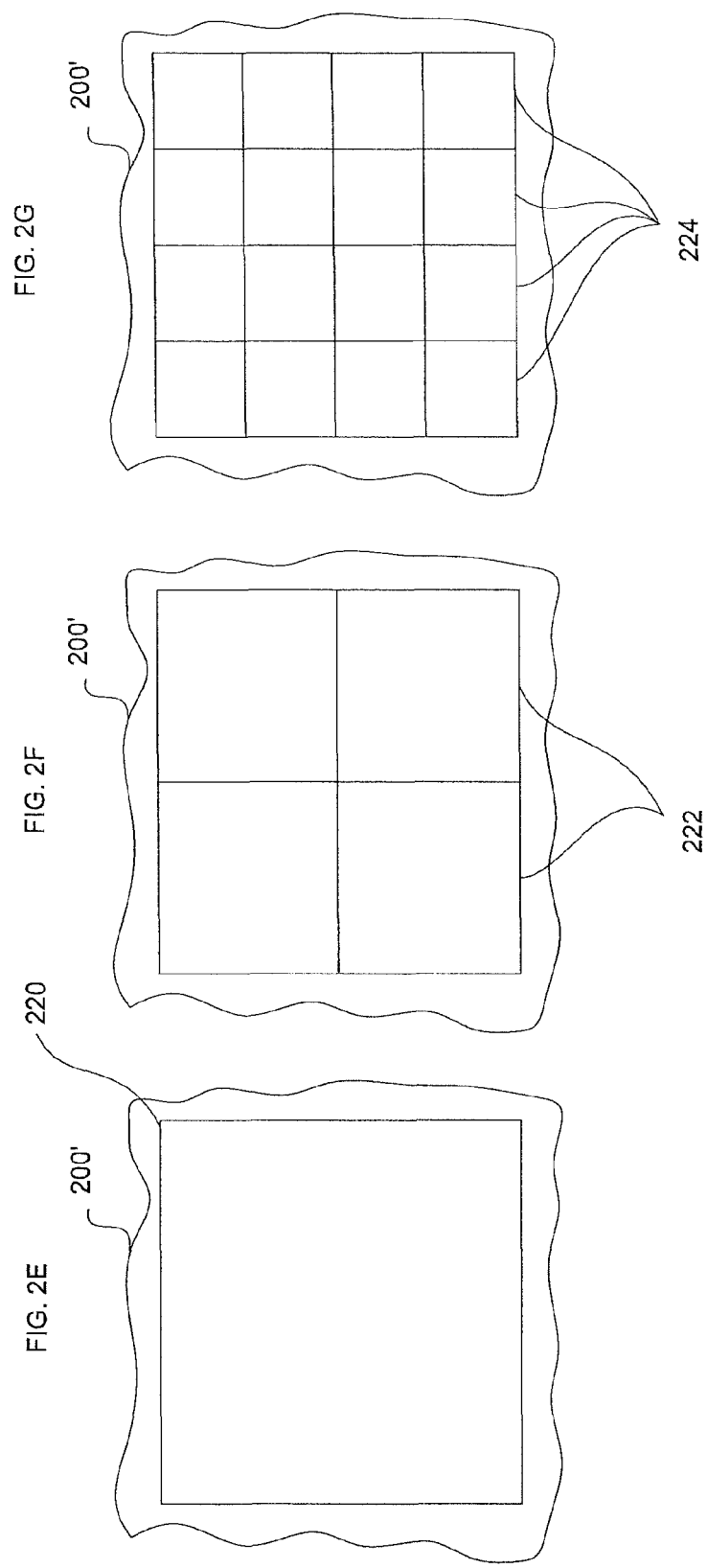

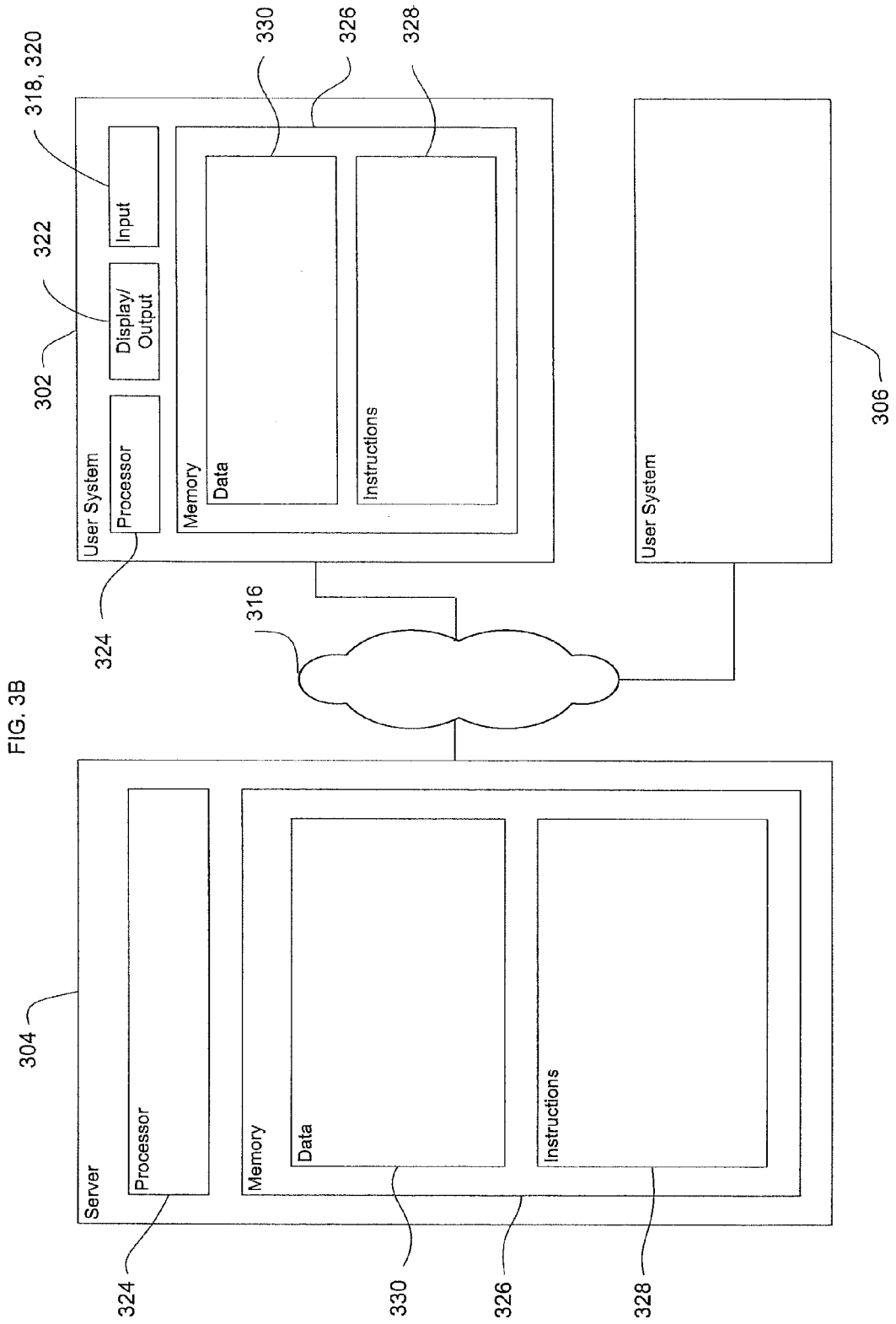

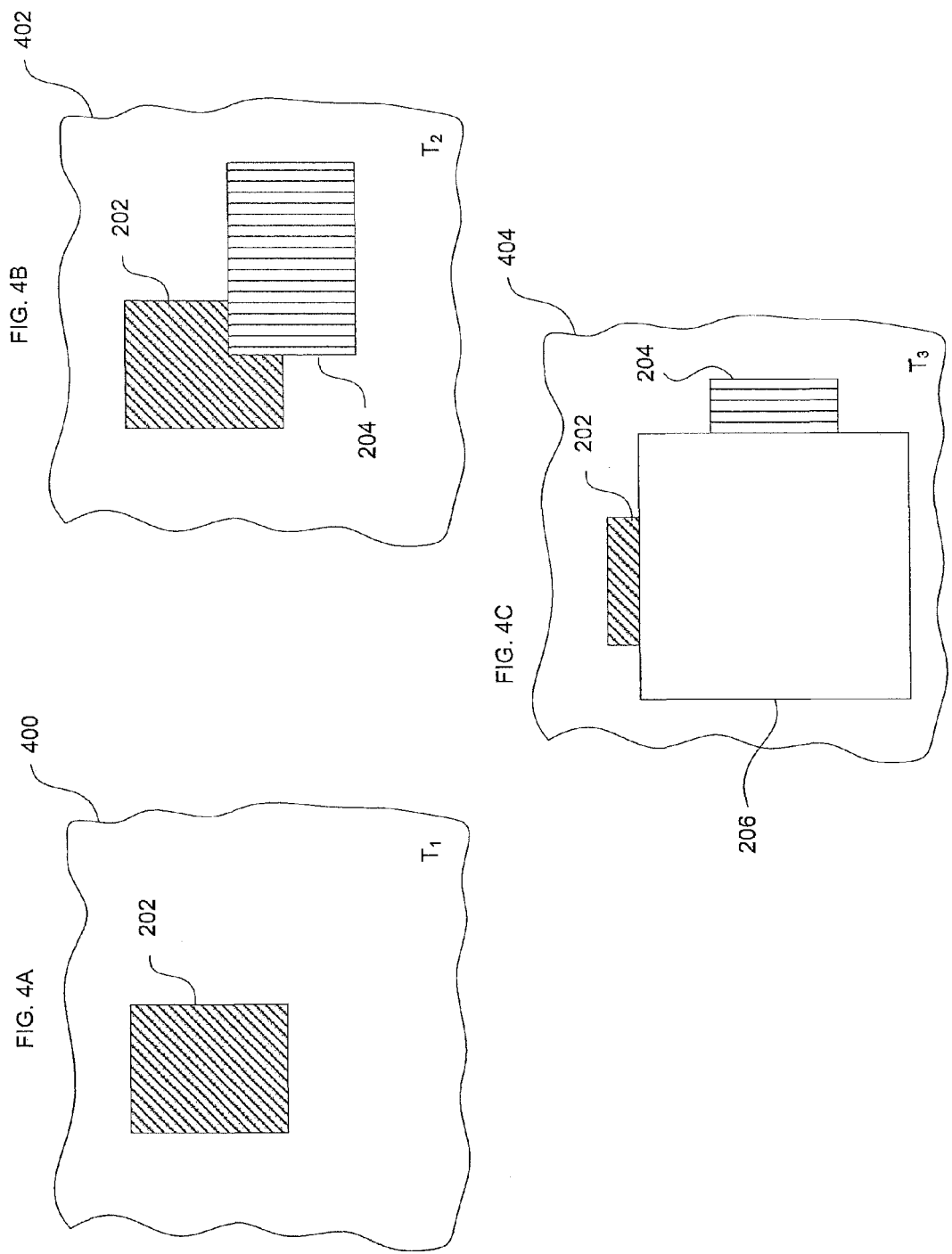

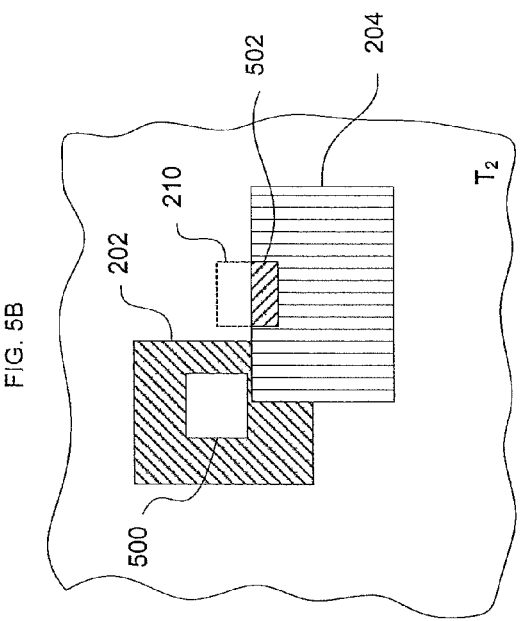
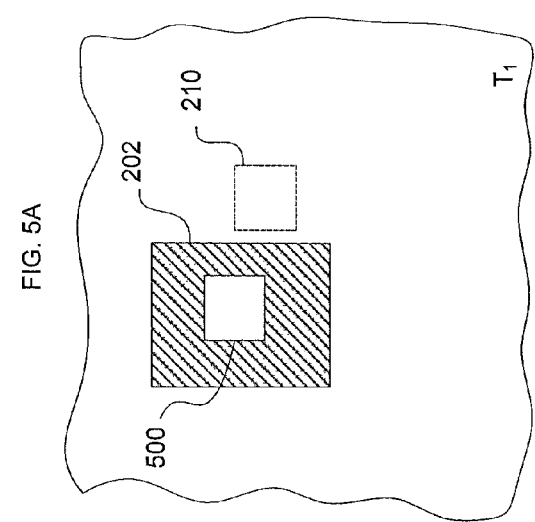
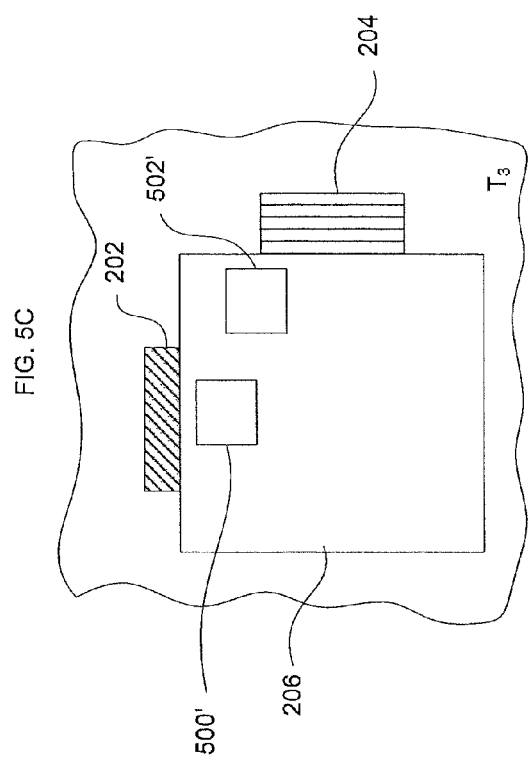

FIG. 7A

| Acquisition Time ($T_N$) | Asset | Level of Detail |
|---|---|---|
| $T_1$ | B | 2 |
| $T_2$ | C | 4 |
| $T_3$ | E | 5 |
| $T_4$ | D | 5 |
| $T_5$ | A | 1 |
| $T_6$ | F | 6 |

FIG. 7B

| Level of Detail (1-6) | Asset | Time-Based Tile(s) |
|---|---|---|
| 1 | A | $T_1 = B$; $T_2 = B+C$; $T_3 = B+C+E$; $T_4 = B+C+E+D$; $T_5 = B+C+E+D+A$; $T_6 = B+C+E+D+A+F$ |
| 2 | B | $T_1 = B$; $T_2 = B+C$; $T_3 = B+C+E$; $T_4 = B+C+E+D$; $T_5 = B+C+E+D+A$; $T_6 = B+C+E+D+A$ |
| 3 | -- | $T_2 = C$; $T_3 = C+E$; $T_4 = C+E+D$; $T_6 = C+E+D+F$ |
| 4 | C | $T_2 = C$; $T_3 = C+E$; $T_4 = C+E+D$; $T_6 = C+E+D+F$ |
| 5 | E, D | $T_3 = E$; $T_4 = E+D$; $T_6 = E+D+F$ |
| 6 | F | $T_6 = F$ |

FIG. 7C

| Asset | Location | Level of Detail | Acquisition Time |
|---|---|---|---|
| A | $X_2, Y_{10} - X_5, Y_5$ | 1 | $T_1$ |
| B | $X_4, Y_6 - X_{10}, Y_3$ | 2 | $T_2$ |
| C | $X_0, Y_8 - X_8, Y_0$ | 4 | $T_3$ |
| D | $X_3, Y_3 - X_7, Y_7$ | 5 | $T_4$ |
| E | $X_6, Y_0 - X_9, Y_5$ | 5 | $T_5$ |
| F | $X_5, Y_2 - X_9, Y_9$ | 6 | $T_6$ |

L1 (2^1 x 2^1)

L2 (2^2 x 2^2)

•
•
•

L4 (2^4 x 2^4)

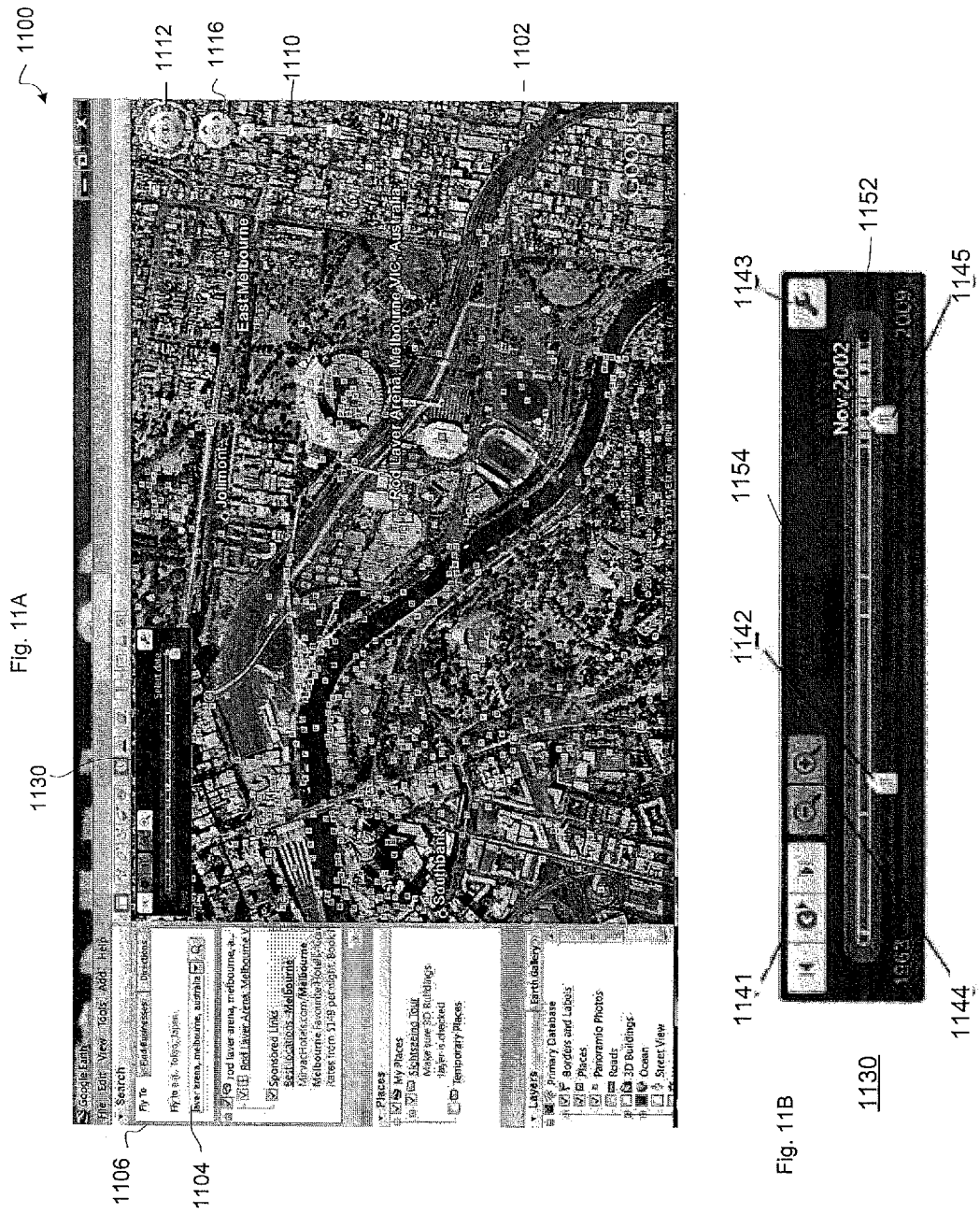

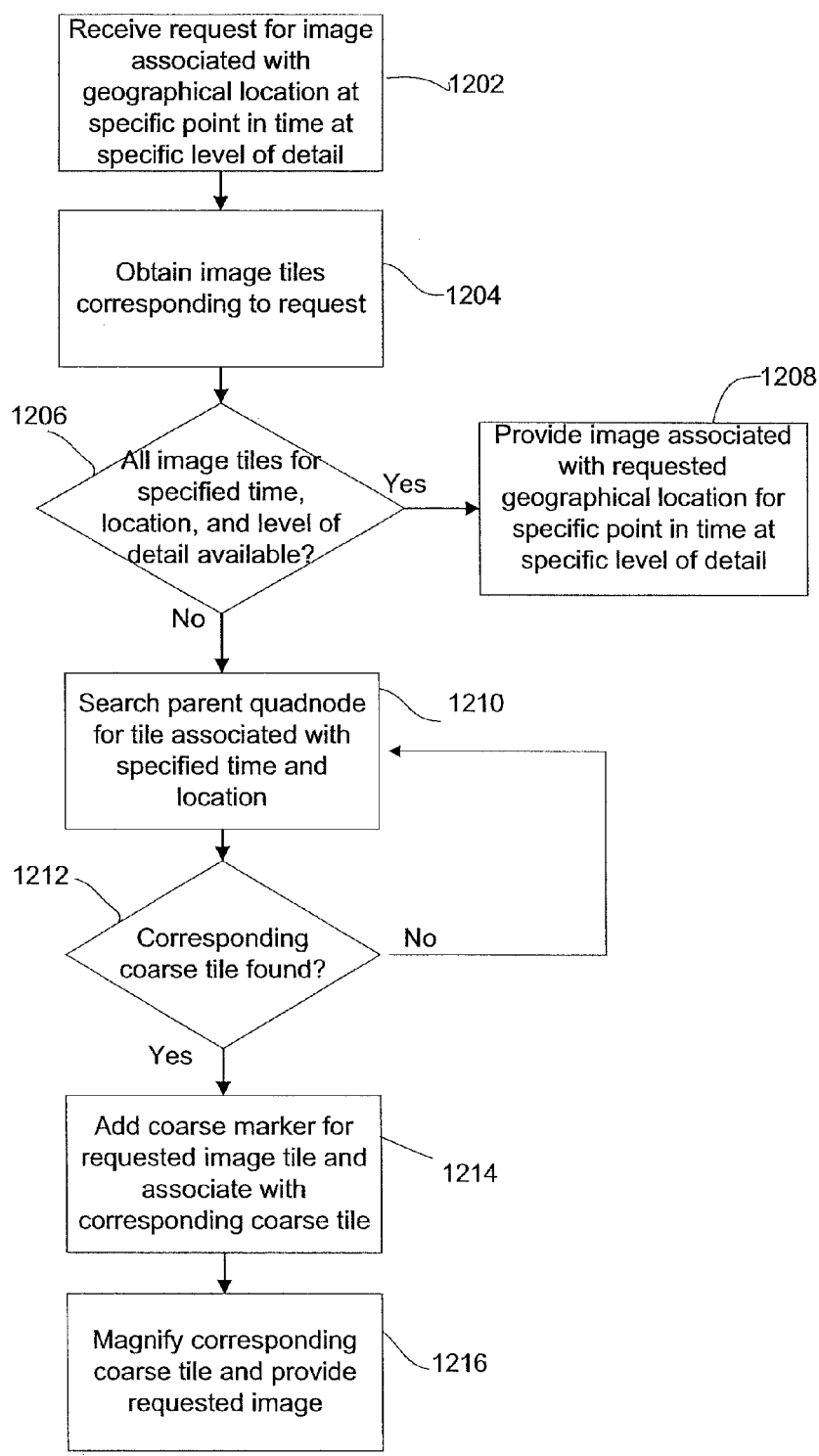

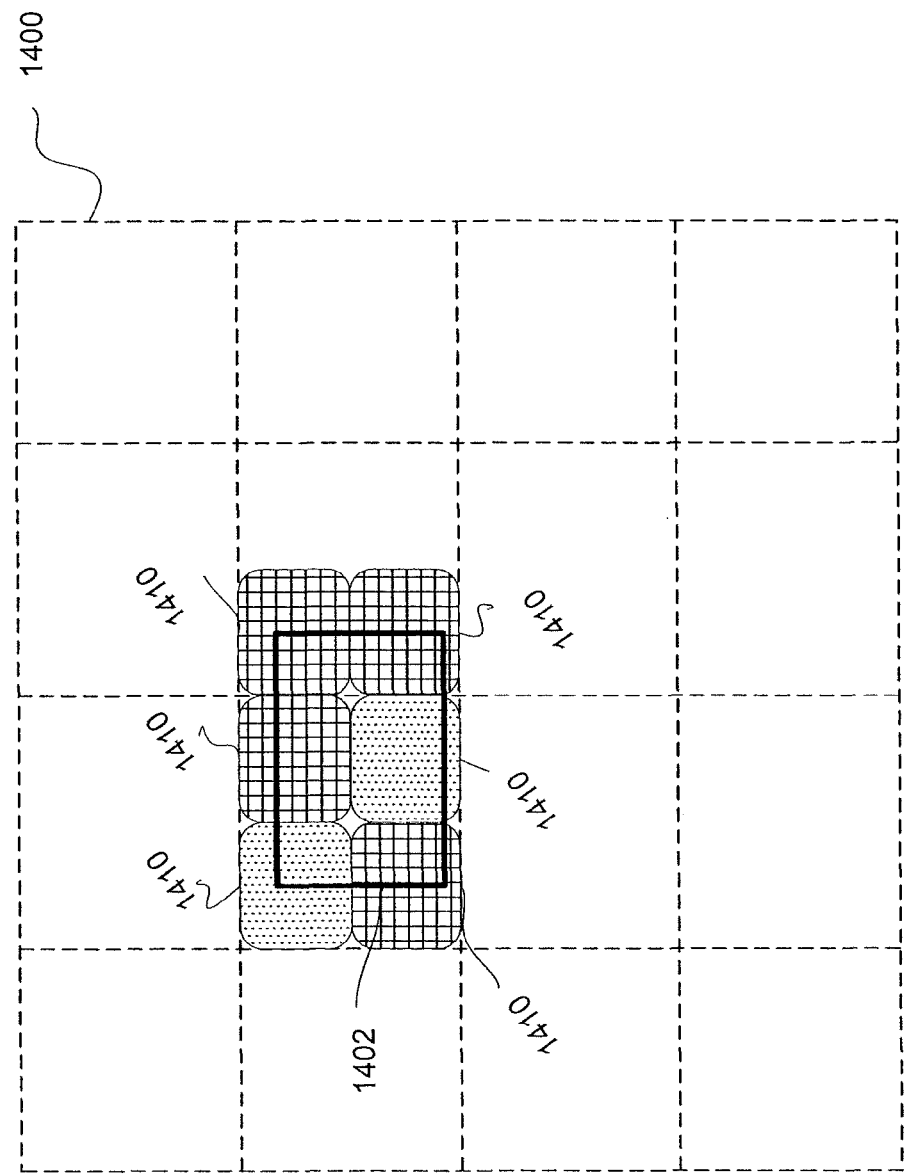

ARCHITECTURES AND METHODS FOR CREATING AND REPRESENTING TIME-DEPENDENT IMAGERY

CROSS-REFERENCE TO RELATED APPLICATIONS

The present application is a continuation-in-part of U.S. patent application Ser. No. 12/231,290, filed Aug. 28, 2008, the entire disclosure of which is hereby incorporated herein by reference.

BACKGROUND OF THE INVENTION

Imagery taken by satellites, planes and other sources has long been used to provide visual information about the earth. Recently, dramatic improvements in computer processing power and broadband streaming technology have led to the development of interactive systems for navigating imagery (e.g., map imagery). Some interactive map navigation systems provide a user interface ("UI") with navigation controls for dynamically navigating cities, neighborhoods and other terrain in three dimensions. The navigation controls enable users to tilt, pan, rotate, zoom and activate terrain and buildings for different perspectives at a point of interest. An example of an interactive 3D map system for navigating Earth imagery is Google Earth™ developed by Google Inc. (Mountain View, Calif.).

The production imagery used by interactive map navigation systems is typically derived by processing large pieces of geo-located imagery or "assets." Such assets can be taken from a single pass of a satellite, airplane or other airborne platform, or can be stitched together from multiple aerial images. Once the assets are processed, they can be moved to datacenters where it can be distributed to client devices.

Different assets may have different resolutions and/or may be captured at different points in time. At some points in time, assets may not be available at particular resolutions. Accordingly, for such points in time, a viewing field may include only the assets available at the specified resolution. This may result in blank spaces in the viewing field, or an inability to view any of the assets for such points in time at the specified resolution.

SUMMARY OF THE INVENTION

One aspect of the invention provides a method of processing geographical imagery, comprising obtaining imagery from an imagery source, identifying an acquisition date and a level of detail for at least some of the imagery obtained from the imagery source, blending overlapping pieces of imagery using a processor of a computer based on respective acquisition dates to form one or more image tiles associated with each acquisition date, storing the one or more image tiles in memory associated with the computer, the stored tiles being organized by level of detail, determining at the processor the acquisition dates for which imagery is available at a first level of detail and not a second level of detail, storing, for the second level of detail, an indicator linking to the imagery at the first level of detail for the acquisition dates where the second level of detail is not available, and providing at least one of the image tiles having a selected acquisition date from the memory to a client device upon request for an image associated with a geographical location for the selected acquisition date. The providing at least one of the image tiles may include providing chosen image tiles having the first level of detail and the second level of detail to the client device upon request for an image associated with a geographical location for the selected acquisition date and the second level of detail. Further, the image tiles having the first level of detail may be magnified, for example, at the client device. Output relating to the acquisition dates for which the imagery is available at the first level of detail or the second level of detail may be provided, the output being readable by a client device to form a graphical user interface. Storing the tiles organized by level of detail may include implementing a quadtree architecture.

Another aspect of the invention provides a processing system for processing geographical imagery, comprising at least one processor and a memory for storing data organized by a level of detail associated with the data, the memory electrically coupled to the at least one processor. The at least one processor may be operable to obtain imagery from an imagery source, identify an acquisition date and a level of detail for at least some of the imagery obtained from the imagery source, blend overlapping pieces of imagery based on respective acquisition dates to form one or more image tiles associated with each acquisition date, store the one or more tiles in the memory, determine the acquisition dates for which imagery is available at a first level of detail and not a second level of detail, store for the second level of detail an indicator linking to the imagery at the first level of detail for the acquisition dates where the second level of detail is not available, and provide at least one of the image tiles having a selected acquisition date from the memory to a client device upon request for an image associated with a geographical location for the selected acquisition date. The at least one processor may be further operable to provide chosen image tiles having the first level of detail and the second level of detail to the client device upon request for an image associated with a geographical location for the selected acquisition date and the second level of detail. The at least one processor may be further operable to magnify the image tiles having the first level of detail. The at least one processor may be further operable to provide output relating to the acquisition dates for which the imagery is available at the first level of detail or the second level of detail, the output being readable by a client device to form a graphical user interface. The at least one processor may also be operable to store the one or more tiles in accordance with a quadtree architecture.

Yet another aspect of the invention provides a method for displaying available dates associated with historical imagery of a specified location. This method may comprise determining a first set of dates for which real tiles associated with a specified location and a first level of detail exist, determining a second set of dates for which coarse tiles associated with the specified location and a second coarser level of detail exist, displaying through a user interface the first set of dates and the second set of dates, receiving input from a user requesting imagery associated with the specified location, one of the first or second sets of dates, and a specified level of detail, searching a database for tiles associated with the requested imagery, and displaying the tiles associated with the requested imagery on a display. The method may additionally comprise requesting the tiles associated with the requested imagery from a server. If the input from the user requests imagery associated with a given one of the first set of dates, the searching for tiles may comprise identifying for each quadnode a most recent tile prior to the given date. If the input from the user requests imagery associated with a given one of the second set of dates, the searching for tiles may further comprise identifying parent nodes of quadnodes associated with the requested imagery, and for each parent node, identifying a most recent tile prior to the given date, and magnifying the most recent tiles identified in the parent nodes. The level of detail requested by the user is determined using a viewing field set by the user.

A further aspect of the invention provides a client device for displaying available dates associated with historical imagery of a specified location, the client device being electronically coupled to a server. The client device may comprise a processor operable to determine a first set of dates for which real tiles associated with a specified location and a first level of detail exist, determine a second set of dates for which coarse tiles associated with the specified location and a second coarser level of detail exist, display through a user interface the first set of dates and the second set of dates, receive input from a user requesting imagery associated with the specified location, one of the first or second sets of dates, and a specified level of detail, search for tiles associated with the requested imagery, and display the tiles associated with the requested imagery. If the input from the user requests imagery associated with one of the first set of dates, the search for tiles may comprise identifying for each quadnode a most recent tile prior to the date. If the input from the user requests imagery associated with one of the second set of dates, the search for tiles may further comprise identifying parent nodes of quadnodes associated with the requested imagery, and for each parent node, identifying a most recent tile prior to the date, and magnifying the most recent tiles identified in the parent nodes. The client device may determine the level of detail requested by the user using a viewing field set by the user.

BRIEF DESCRIPTION OF THE DRAWINGS

FIGS. 2A-G illustrate examples of assets and tiles for a region of interest.

FIGS. 3A-B illustrate a computer system for use in accordance with embodiments of the present invention.

FIGS. 4A-C illustrate asset handling in accordance with aspects of the present invention.

FIGS. 5A-C illustrate tile generation in accordance with aspects of the present invention.

FIGS. 7A-C illustrate assets and image tile generation and indexing in accordance with aspects of the present invention.

FIGS. 11A-11B present screen shots of a GUI in accordance with aspects of the invention.

FIG. 12 presents a flow diagram illustrating processing of a time-based image request in accordance with aspects of the present invention.

FIGS. 14A-14B illustrate supplementation of quadnodes and tiles with parent quadnodes and tiles for a level of detail at a particular time based on a selected viewing field in accordance with aspects of the present invention.

DETAILED DESCRIPTION

The aspects, features and advantages of the present invention will be appreciated when considered with reference to the following description of preferred embodiments and accompanying figures. The same reference numbers in different drawings may identify the same or similar elements. Furthermore, the following description does not limit the present invention; rather, the scope of the invention is defined by the appended claims and equivalents.

Figure 1:
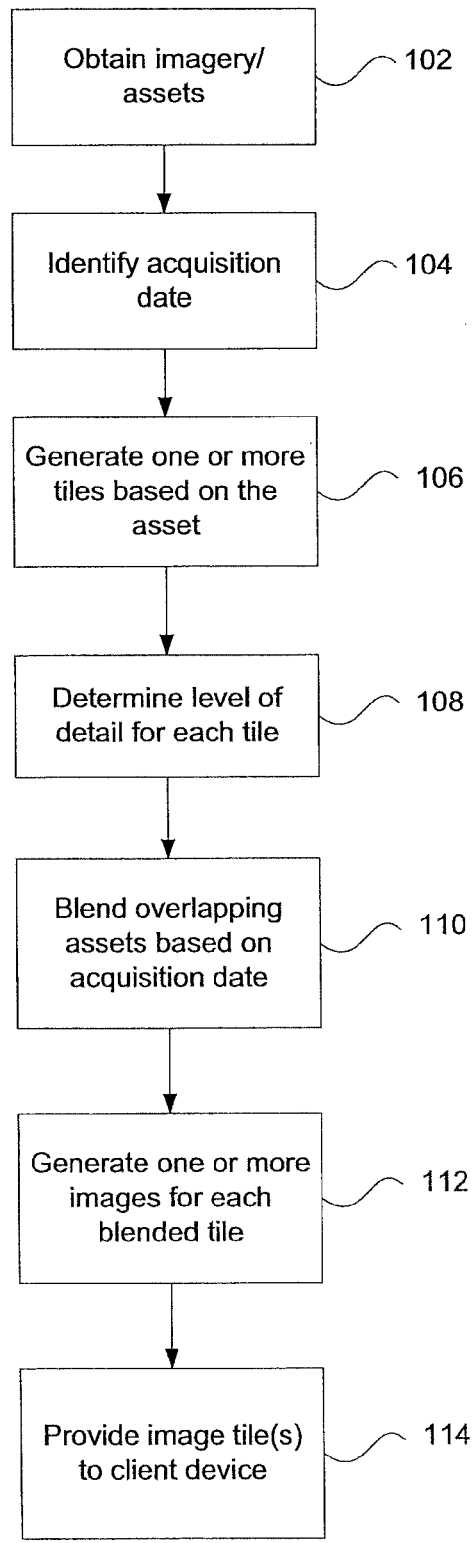
FIG. 1 is a flow diagram in accordance with aspects of the present invention.

Assets having different resolution and/or times of capture may be processed, for instance by "blending" parts of multiple assets together in order to provide images of a particular location or region at particular points in time. FIG. 1 illustrates an exemplary process 100 which produces one or more blended images for a given date, for instance in response to a user request.

The process 100 includes block 102, where the assets (e.g., aerial imagery) are obtained. By way of example, aerial reconnaissance dates back to World War I, if not earlier. Governments have used satellites since the 1960s to take images of the Earth. More recently, commercial satellites have also generated images of the Earth. Assets from different sources may be collected and stored in an image database. As such assets may date from different times, the acquisition date for each asset is identified as shown in block 104.

Various assets can be received from one or more sources and can have a variety of orientations. Such assets can be re-projected into a suitable coordinate system for the map system (e.g., a geospatial coordinate system) and stored in one or more data structures (e.g., database table). The re-projected assets may then be divided into tiles which are processed independently, for example in a parallel processing infrastructure. The tiles may be stored so tiles that include imagery for geographic locations that are close to each other have a high probability of being stored on the same machine or in the same machine cluster to reduce the overhead associated with accessing information located on multiple machines. In this case, the tiles can be sized to fall within the storage constraints of the machines or a cluster of machines. The assets can be divided into any desired shape. A tile shape, however, typically requires less computational and/or representational overhead during processing.

As shown in block 106, one or more tiles may be generated from the assets. Tiles represent a section of imagery at a particular resolution and location. For instance, a given asset may image a certain region of the Earth. FIGS. 2A-2C illustrate an example of three different overlapping assets taken at different times for a particular region 200. In this example, FIG. 2A shows a first asset 202 having a pair of bounding coordinates $X_2, Y_{10}$ and $X_5, Y_5$; FIG. 2B shows a second asset 204 having a pair of bounding coordinates $X_4, Y_6$ and $X_{10}, Y_3$; and FIG. 2C shows a third asset 206 having a pair of bounding coordinates $X_0, Y_8$ and $X_8, Y_0$. The coordinates may represent latitude and longitude, Cartesian coordinates or some other geographic coordinate system. In this example, asset 202 is from a time $T_1$, asset 204 is from a time $T_2$, and asset 206 is from a time $T_3$. A user may request a tile which falls in a region covered by multiple assets. By way of example, a first tile 208 may fall within both assets 202 and 206, while a second tile 210 may overlap assets 204 and 206, as shown in FIG. 2D.

Tiles covering the same region need not be the same size or the same resolution. FIGS. 2E-G illustrate a region 200' which may be covered by different sets of tiles. As shown in FIG. 2E, the region 200' may be covered by a single tile 220 having a first resolution. As shown in FIG. 2F, the region 200' may be covered by a quartet of tiles 222. Each tile 222 may have a second resolution such as a higher resolution than the first resolution. And as shown in FIG. 2G, the region 200' may be covered by a set of tiles 224, for instance 16 tiles each having a third resolution. The third resolution may be higher than the second resolution. Thus, in this example, tile size may decrease as resolution or level of detail ("LOD") increases. Alternatively, each tile 220, 222 and 224 may have the same resolution, e.g., 256×256. Thus, the four tiles 222 may have a combined 512×512 pixels, and the sixteen tiles 224 may have a combined 1024×1024 pixels. Interpolation may be used to generate the tiles 222 from tile 220. Similarly, interpolation may be used to generate the tiles 224 from tile 220 and/or tiles 222. This is known as magnification. Conversely, finer resolution imagery may be resampled to coarser resolution by known imaging techniques. While only three resolutions are identified in this example, it should be understood that any number of resolution levels may be provided.

Returning to FIG. 1, at block 108 the LOD for each asset may be used to generate one or more images for each tile. For instance, asset 202 may have a resolution of 20 cm, asset 204 may have a resolution of 50 cm, and asset 206 may have a resolution of 2 m. In a typical system, different parameters including resolution as well as image quality and image coverage may be used to determine how a given tile is generated.

However, as more and more assets are collected, older assets may be covered up by newer imagery. For instance, asset 206 may completely obscure asset 202 and may partially obscure asset 204. It may be desirable to make the older imagery available so that users can see how the surface of the Earth has changed over time. Thus, in accordance with one aspect of the invention, overlapping assets may be blended together based on acquisition date, as shown in block 110. The blending results in tiles such as tiles 208 and 210 of FIG. 2D.

And as shown in block 112 of FIG. 1, a series of images may be produced for each tile, for instance generating one tile image for each unique date when image assets intersecting the tile were originally acquired. Such tile images may be stored in an image database and/or associated with a data structure, as will be discussed in more detail below. Once the tile images have been created, they may be provided to a client device, for instance in response to a user request, such as shown at block 114.

Figure 3A:
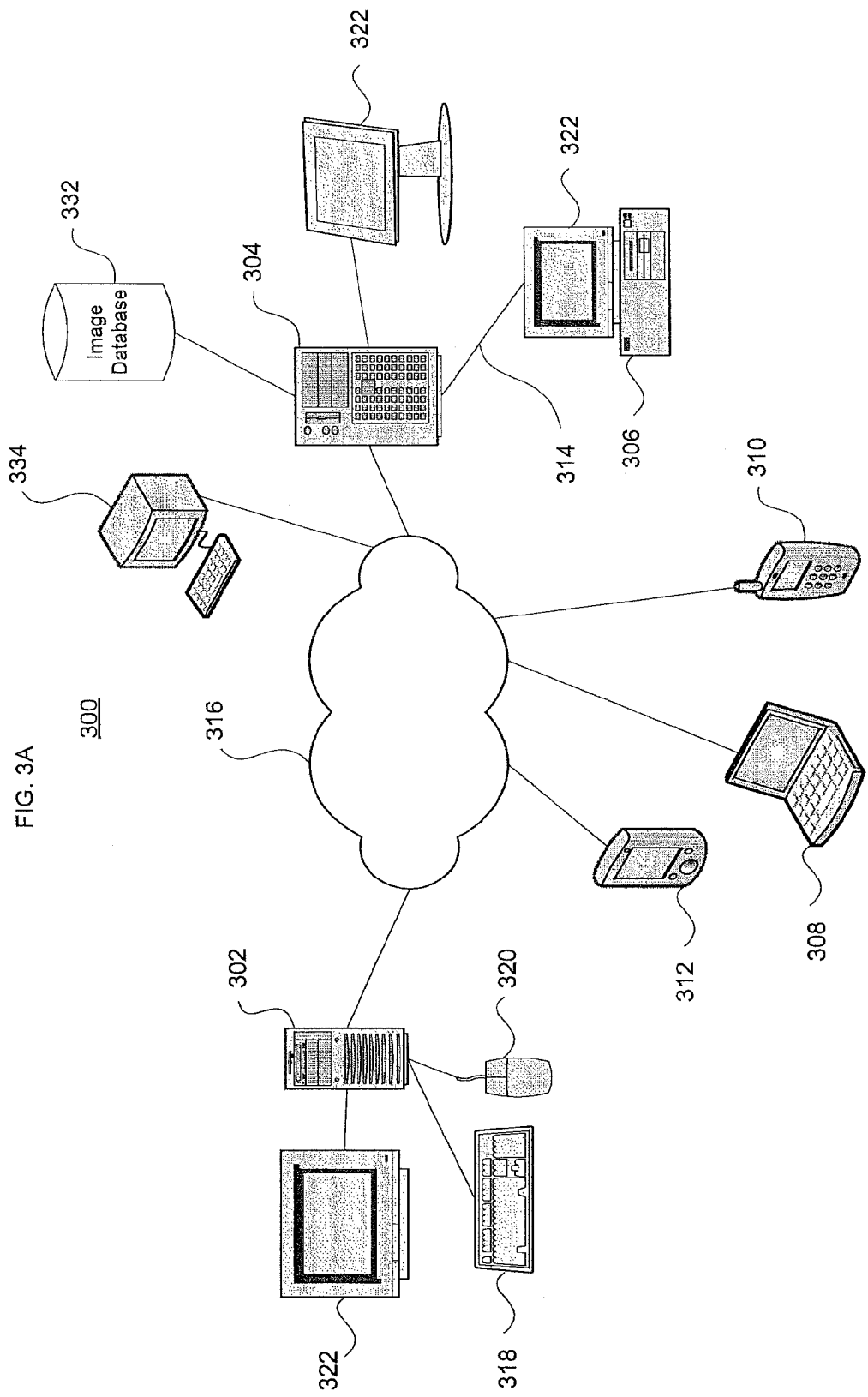

Different architectures may be employed to achieve such results. For instance, FIG. 3A presents a schematic diagram of a computer system depicting various computing devices that can be used alone or in a networked configuration in accordance with aspects of the present invention. For example, this figure illustrates a computer network 300 having a plurality of computers 302, 304, 306 and 308 as well as other types of devices such as portable electronic devices such as a mobile phone 310 and a PDA 312. The computer processing systems may be interconnected via a local or direct connection 314 and/or may be coupled via a communications network 316 such as a LAN, WAN, the Internet, etc. and which may be wired or wireless.

Each computer processing system can include, for example, one or more computing devices having user inputs such as a keyboard 318 and mouse 320 and/or various other types of input devices such as pen-inputs, joysticks, buttons, touch screens, etc., as well as a display 322, which could include, for instance, a CRT, LCD, plasma screen monitor, TV, projector, etc. Each computer 302, 304, 206 and 308 may be a personal computer, server, etc. By way of example only, computers 302 and 306 may be personal computers while computer 304 may be a server and computer 308 may be a laptop. As shown in FIG. 3B each computer such as computers 302 and 304 contain a processor 324, memory 326 and other components typically present in a computer.

Memory 326 stores information accessible by processor 324, including instructions 328 that may be executed by the processor 324 and data 330 that may be retrieved, manipulated or stored by the processor. The memory may be of any type capable of storing information accessible by the processor, such as a hard-drive, ROM, RAM, CD-ROM, flash memories, write-capable or read-only memories. The processor 324 may comprise any number of well known processors, such as processors from Intel Corporation. Alternatively, the processor may be a dedicated controller for executing operations, such as an ASIC.

The instructions 328 may comprise any set of instructions to be executed directly (such as machine code) or indirectly (such as scripts) by the processor. In that regard, the terms "instructions," "steps" and "programs" may be used interchangeably herein. The instructions may be stored in any computer language or format, such as in object code or modules of source code. The functions, methods and routines of instructions in accordance with the present invention are explained in more detail below.

Data 330 may be retrieved, stored or modified by processor 324 in accordance with the instructions 328. The data may be stored as a collection of data. For instance, although the invention is not limited by any particular data structure, the data may be stored in computer registers, in a relational database as a table having a plurality of different fields and records, XML documents, or flat files. As will be explained in more detail below, certain image-related data may be stored in flat files such as keyhole flat files ("KFF").

The data may also be formatted in any computer readable format such as, but not limited to, binary values, ASCII or EBCDIC (Extended Binary-Coded Decimal Interchange Code). Similarly, the data may include images stored in a variety of formats such as vector-based images or bitmap images using lossless (e.g., BMP) or lossy (e.g., JPEG) encoding. Moreover, the data may include any information sufficient to identify the relevant information, such as descriptive text, proprietary codes, pointers, references to data stored in other memories (including other network locations) or information which is used by a function to calculate the relevant data.

Although the processor 324 and memory 326 are functionally illustrated in FIG. 3B as being within the same block, it will be understood that the processor and memory may actually comprise multiple processors and memories that may or may not be stored within the same physical housing or location. For example, some or all of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 326 such as hard drives or the like.

In one aspect, server 304 communicates with one or more client computers 302, 306 and/or 308, as well as devices such as mobile phone 310 and PDA 312. Each client computer or other client device may be configured similarly to the server 304, with a processor, memory and instructions, as well as one or more user input devices 318, 320 and a user output device, such as display 322. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 304 and client computers and other devices are capable of direct and indirect communication with other computers, such as over network 316. Although only a few computing devices are depicted in FIGS. 3A and 3B, it should be appreciated that a typical system can include a large number of connected servers and clients, with each different computer being at a different node of the network. The network 316, and intervening nodes, may comprise various configurations and protocols including the Internet, intranets, virtual private networks, wide area networks, local networks, private networks using communication protocols proprietary to one or more companies, Ethernet, WiFi, Bluetooth and HTTP.

Communication across the network, including any intervening nodes, may be facilitated by any device capable of transmitting data to and from other computers, such as modems (e.g., dial-up or cable), network interfaces and wireless interfaces. Server 304 may be a web server. Although certain advantages are obtained when information is transmitted or received as noted above, other aspects of the invention are not limited to any particular manner of transmission of information. For example, in some aspects, the information may be sent via a medium such as a disk, tape, CD-ROM, or directly between two computer systems via a dial-up modem. In other aspects, the information may be transmitted in a non-electronic format and manually entered into the system.

Moreover, computers and client devices in accordance with the systems and methods described herein may comprise any device capable of processing instructions and transmitting data to and from humans and other computers, including network computers lacking local storage capability, PDA's with modems such as PDA 312 and Internet-capable wireless phones such as mobile phone 310.

As shown in FIG. 3A, the network 300 may also include an image database 332 and/or a map information provider 334. The image database 332 and the map information provider 334 may be directly or indirectly coupled to server 304. In an alternative, the image database 332 and the map information provider 334 may be part of or otherwise logically associated with the server 304. The image database 332 may store data 330 in one or more KFFs. The map information provider 334 may obtain assets and other information, including satellite data, aerial photographs, digital maps, elevation data, GPS coordinates, etc. from one or more sources (not shown). Examples of an image database and a map information provider are provided in jointly owned U.S. Pat. No. 7,643,673, ("the '673 Patent") entitled "Markup Language for Interactive Geographic Information System," issued Jan. 5, 2010, the entire disclosure of which is hereby expressly incorporated by reference herein. Furthermore, each client device (e.g., computers 302, 306 and 308, as well as mobile phone 310 and PDA 312), may include or run application software such as a geospatial browser, which may include a mapping module, as disclosed in the '673 Patent.

As discussed above with regard to FIGS. 2A-2D, different overlapping assets may be imaged at different times for a particular region of interest. Thus, when preparing a given tile encompassed by multiple assets, different options are available. For instance, one may "rank" the assets based on resolution. Here, the highest resolution assets may be placed on a top or frontmost layer, while the next higher resolution asset may be placed in a next lower layer, and so on in order of decreasing resolution. The layers may be blended in this manner to provide for a "best" resolution based upon the available assets.

The example set forth above in FIG. 2D presents such a scenario. Here, tiles 208 and 210 are formed using the best available asset resolution. Thus, as shown in the figure, the tile 208 may be comprised solely of a portion of the asset 202, while the tile 210 may comprise a portion of the asset 204 (shown as the lower half of the tile) and a portion of the asset 206 (shown as the upper half of the tile.

However, tiles may be formed based on criteria other than resolution. A particularly suitable criterion is by date of acquisition of the asset(s). For instance, in many situations a user may choose to view a region of interest as it looked at one or more points in time. Evaluating how the landscape evolves is often relevant to urban planning (e.g., how has a city expanded over time), ecology (e.g., has the size of wetlands shrunk due to construction) and home buyers (e.g., how many homes in the neighborhood have been renovated in recent years), to name a few. Thus, according to one aspect of the present invention, assets may be blended to produce multiple outputs (e.g., tiles) for a given location, where each output represents the appearance of that location at a particular time.

In the example in FIGS. 2A-C, the asset 202 is from time $T_1$, the asset 204 is from time $T_2$, and the asset 206 is from time $T_3$. Suppose that time $T_1$ is the earliest and time $T_3$ is the most recent. In this case, one could produce at least three blended views. Examples of such views are presented in FIGS. 4A-C. As shown in FIG. 4A, the view 400 at time $T_1$ includes only asset 202. The view 402 at time $T_2$, shown in FIG. 4B, includes both asset 202 and asset 204. Here, a combination of the two assets has asset 204 overlying asset 202, even though asset 202 may include higher resolution imagery. And as shown in FIG. 4C, the view 404 incorporates all three assets 202, 204, and 206, with the most recent asset 206 overlying both asset 204 and asset 202.

If a user requests a view covered by a tile comparable to tile 208 of FIG. 2D, the resultant tile provided will depend on the time of interest. For instance, as shown in FIG. 5A, at time $T_1$ tile 500 will be provided, where this tile is equivalent to tile 208 of FIG. 2D as both are derived from asset 202. As shown in FIG. 5B, at time $T_2$ the tile 500 is also provided, as asset 204 does not encompass this region. In contrast, as shown in FIG. 5C, at time $T_3$ tile 500' is provided, where this tile comprises imagery from asset 206 but preferably not from asset 202.

Similarly, if a user requests a view covered by a tile comparable to tile 210 of FIG. 2D, the resultant tile provided will depend on the time of interest. Here, tile 210 is illustrated in broken lines for reference. In this case, at time $T_1$ (see FIG. 5A) no tile will be provided because asset 202 does not encompass the region of interest. As shown in FIG. 5B, at time $T_2$ tile 502 is provided. In this example, only a portion of tile 210, namely tile 502, is available due to the coverage of asset 204. In this case, the display may not provide an image for the unavailable portion of tile 210, may indicate to the user that no data is available for that portion of the region of interest, or may provide a default image that may or may not have a date associated with it. In contrast, as shown in FIG. 5C, at time $T_3$ tile 502' is provided. This tile comprises imagery from asset 206 but preferably not from asset 204.

Figure 6:
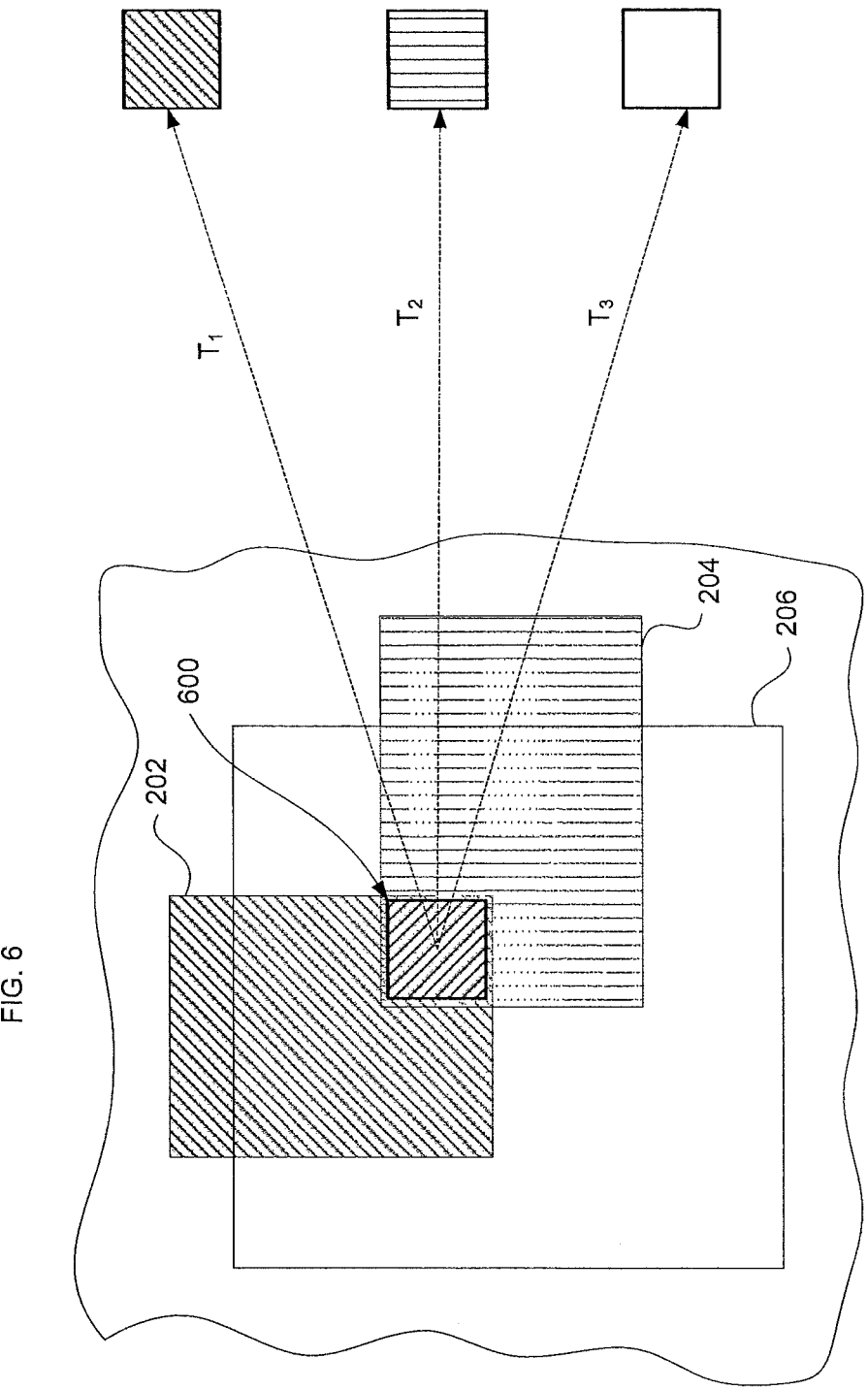
FIG. 6 illustrates tile generation in accordance with aspects of the present invention.

FIG. 6 illustrates another case involving assets 202, 204 and 206. As with the previous examples, asset 202 is the oldest asset, asset 204 is the next oldest asset, and asset 206 is the most recent asset. For ease of illustration, the three assets are presented with asset 204 overlying asset 202 and with asset 204 being partly transparent to show the earlier asset. Similarly, asset 206 overlies assets 202 and 204, and is partly transparent to show both earlier assets.

In the present case, a new region of interest illustrated 600 is shown. Here, region of interest 600 is encompassed by all three assets 202, 204, and 206. Thus, as shown by the dashed arrow, at time $T_1$ a first tile would be formed by the overlapping portion of asset 202. As shown by the dashed arrow, at time $T_2$ a second tile would be formed by the overlapping portion of asset 204. And as shown by the dashed arrow, at time $T_3$ a third tile would be formed by the overlapping portion of asset 206.

In an alternative, it is possible to use imagery from an underlying asset to fill in any gaps or address any defects in the overlying asset of the desired point in time. However, this is preferably done only along the edges of the overlying asset. This is because effects of spatial and/or color misregistration between assets can be magnified, resulting in a poor quality image or tile. Feathering the edges of adjacent asset imagery makes the edges less prominent and distracting.

In accordance with an aspect of the present invention, blending of adjacent and/or overlapping tiles is done using asset acquisition date as the primary criterion blending criterion. FIG. 7A presents an example where six assets (A-F) are obtained at six different times ($T_1, \ldots T_6$). Each asset is associated with a level of detail, LOD, ranging between 1 (e.g., lowest resolution) and 6 (e.g., highest resolution). In the present case, none of the assets A-F completely covers the tile of interest.

FIG. 7B illustrates how multiple tile images are generated for the tile of interest when multiple assets of different acquisition dates are available. Thus, as shown in the rightmost column in this figure, six different tile images may be generated. As presented in the figure, the symbol "+" means that the asset to the right of the + overlays the asset to the left of the + when blended. For instance, while at time $T_1$ only asset B is used to generate a given tile image, at time $T_2$ assets B and C are blended to generate another tile image. In this case, as asset B was acquired at time $T_j$ and asset C was acquired at time $T_2$, asset C overlays asset B in the blended tile image.

Similarly, for time $T_3$, the three assets B, C and E are used, with asset E overlying C and C overlying B. Additional tile images for times $T_4$, $T_5$ and $T_6$ are generated similarly.

A user who is interested in viewing this particular tile of interest has the option to view the tile at six different points in time. By way of example, the user interface of a client device (e.g., computer 302, 306 or 308, mobile phone 310 or PDA 312 of FIG. 3A) may provide the user with a slider bar, radio buttons or other actuator to select a particular point in time. Thus, if the user selects time $T_1$, then the tile image based solely on asset B is shown. If the user selects time $T_4$, then the tile image based on the combination of assets B, C, E and D (blended in the manner shown in the first row) is provided. And if the user selects time $T_6$, then the tile image based on the combination of assets B, C, E, D, A and F (blended in the manner shown in the first row) is provided.

If asset acquisition time was the only criterion, then the first row of FIG. 7B would provide all of the necessary tile images for the tile of interest. However, in accordance with another aspect of the present invention, further tile images may be generated based on LOD and/or other criteria. In the present figure, additional tile images are generated in view of LOD. As shown in the second row (LOD=2), fewer tile images may be generated due to the omission of asset A, which has a LOD of 1. The tiles generated at LOD 2 may be of different size and/or resolution than the tiles generated at LOD 1. For instance, while the tile image(s) for time $T_4$ having an LOD of 2 may be generated using the same assets (B+C+E+D) as the tile image(s) for time $T_4$ having an LOD of 1, more tiles (e.g., sub-tiles) of higher resolution may be employed.

In the example of FIG. 7B, no new tile image need be generated in this case for time $T_5$, as asset A is the only asset for that point in time. Therefore, should a user request a tile of interest at time $T_5$ having a minimum resolution of at least 2, the tile image generated for time $T_4$ or another point in time may be displayed, or the client device may magnify the data. Furthermore, for time $T_6$, in one example only assets B, C, E, D and F are employed at this resolution level. In another example, a blend of higher resolution images may involve a coarser resolution asset such as asset A. Thus, a tile of interest for time $T_6$ may include data magnified from the original resolution of asset A. In one variation, only coarser levels from older assets will be used. Different combinations of assets may be generated for different resolution levels as illustrated in FIG. 7B.

In another variation, the oldest or earliest available asset may be designated to fill in empty or otherwise deficient spots in tiles. This earliest or "baseline" asset may be used as a background layer encompassing the entire tile. This base asset (e.g., asset 0 from time $T_0$) may be magnified (wherein a magnified asset is represented by $M_X$) as needed in a given blend. In the following example, it is assumed that magnifying by one or two levels is sufficient to make an asset completely cover a tile. Thus, a modified version of the table in FIG. 7B may be as follows:

| LOD | Time-Based Tile(s) |
|---|---|
| 1 | $T_1 = M_0 + B$; $T_2 = M_0 + B + C$; $T_3 = M_0 + B + C + E$; $T_4 = M_0 + B + C + E + D$; $T_5 = M_0 + B + C + E + D + A$; $T_6 = M_4 + B + C + E + D + F$ |
| 2 | $T_1 = M_0 + B$; $T_2 = M_0 + B + C$; $T_3 = M_0 + B + C + E$; $T_4 = M_0 + B + C + E + D$; $T_6 = M_0 + M_4 + B + C + E + D + F$ |
| 3 | $T_2 = M_B + C$; $T_3 = M_B + M_C + E$; $T_4 = M_B + M_C + E + D$; $T_6 = M_B + M_C + E + D + F$ |
| 4 | $T_2 = M_B + C$; $T_3 = M_B + M_C + E$; $T_4 = M_B + M_C + E + D$; $T_6 = M_B + M_C + E + D + F$ |
| 5 | $T_3 = M_B + M_C + E$; $T_4 = M_B + M_C + E + D$; $T_6 = M_B + M_C + E + D + F$ |
| 6 | $T_6 = M_C + ME + M_D + F$ |

In the above table, for an LOD of 3, if magnifying asset B by one level is not sufficient to cover the tile, then the time-based tiles would be derived by the following blends: $T_2=M_0+M_B+C$; $T_3=M_0+M_B+M_C+E$; $T_4=M_0+M_B+M_C+E+D$; $T_6=M_0+M_B+M_C+E+D+F$. Also, as shown, no additional dates are triggered by magnified assets at higher than their native resolution. Thus, the LOD of 5 does not have $T_1=M_B$.

As discussed above with regard to FIG. 1, one or more images may be generated for each tile by blending available assets (see block 112). For a large collection of overlapping assets there are potentially many possible blends. For instance, in a case where there are three assets (e.g., A, B and C), it is possible to blend 15 combinations (e.g., A, B, C, AB, AC, BA, BC, CA, CB, ABC, ACB, BAC, BCA, CAB and CBA). Each blend may form a different output image. The potential large number of blends may make displaying and navigation difficult. Therefore, in accordance with an aspect of the present invention, a criterion which varies monotonically from blended image to blended image is used to order and reduce the quantity of blended images.

One such criterion is time. The tile images may be primarily or solely based on the acquisition date of each asset. Optionally, other criteria such as LOD may be employed to generate tile images. Generating tile images focusing on acquisition date enables the architecture to provide a user with the option to view a region of interest at various points in time. Thus, the user may see images showing how the region of interest has changed over time.

In accordance with another aspect of the invention, because LOD is not primarily determinative of the blending order of assets, there may be no need to eliminate poor quality sections of images. As discussed above, while it is possible to use imagery from an underlying asset to fill in any gaps or address any defects in the overlying asset, effects of spatial and/or color misregistration between assets can be magnified. Therefore, in this case, unless there is a direct collision of acquisition dates (e.g., two assets have the exact same time of acquisition), it is preferred not to eliminate poor quality sections of an asset's image. Alternatively, if such direct collision does occur, a hybrid blending scheme incorporating LOD or other criteria may be employed.

Another possible issue with asset acquisition is that different assets may be received, e.g., by map information provider 334, from multiple vendors. Each vendor may have a different may of reporting asset acquisition dates. Some assets may have no date at all. Others may be composed from images that were acquired over a period of several days, months or years. Some assets may have dates that contain just the year, or just the year and month. And some assets may have an acquisition time which is accurate to the second. In one embodiment, all acquisition granularities will be accepted and sorted accordingly. In another embodiment, the range of acquisition may be narrowed to a time interval. In this case, the end of the time interval may be used as the acquisition date. For instance, if an asset is composed of images taken over the course of Jun. 1, 2008 through Jun. 30, 2008, then Jun. 30, 2008 would be the acquisition date associated with that asset.

In accordance with another aspect of the present invention, assets may be indexed in accordance with the acquisition date and/or image tiles may be indexed by most recent acquisition date resulting from the blending operation. Given the available acquisition information for tile images, it is desirable to associate such information with a common date format. By way of example, the date may be in the following format: YYYYMMMDDHHMMSS. In one example, each asset may be indexed with acquisition date (e.g., YYYYMMMDDHHMMSS format), location (e.g., X, Y pairs, latitude and longitude format, etc) and LOD, such as shown in FIG. 7C. Each blended image tile generated for a given tile/region of interest may also be stored in accordance with such parameters.

Once tiles have been generated and/or blended for different times of interest, the tiles should be stored and indexed in a manner enabling easy access and/or manipulation. As discussed above, multiple image tiles for a given region of interest may be associated with a resultant acquisition time, blended level of detail and location.

Figure 8A:
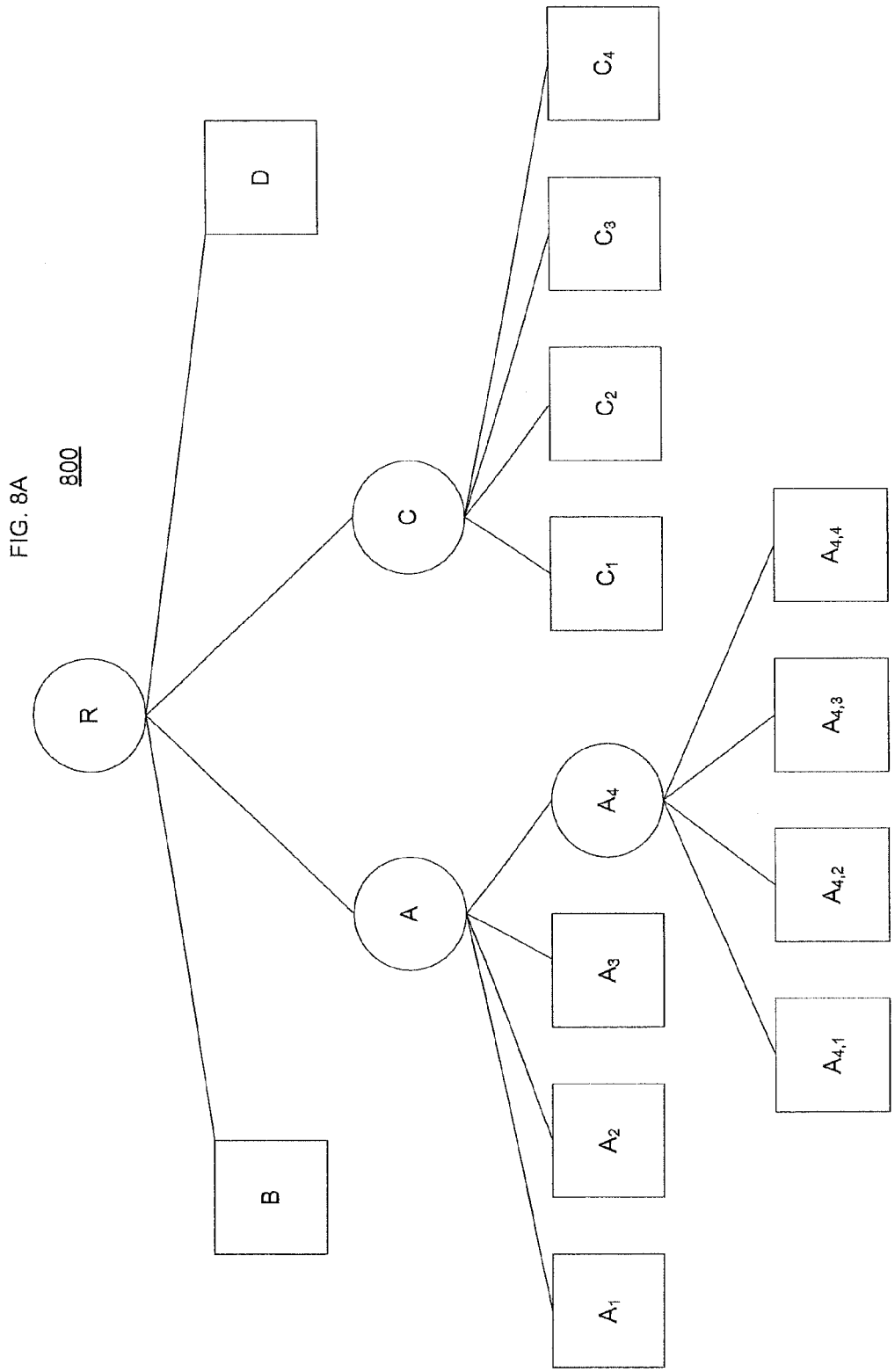
FIGS. 8A-B illustrate a quadtree hierarchical spatial data structure and tile generation in accordance with aspects of the present invention.
Figure 8B:
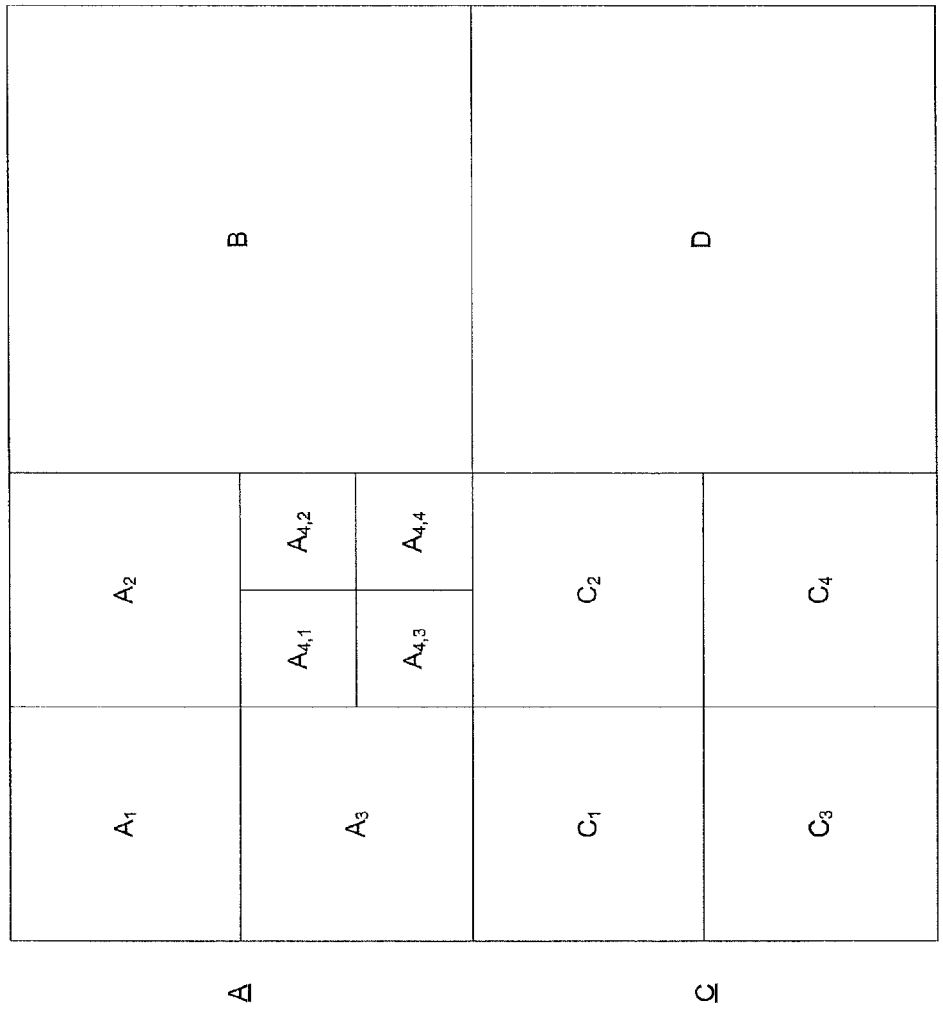

In one example, image tiles and associated data are stored in a "quadtree" structure. FIGS. 8A and 8B illustrate an exemplary hierarchical spatial data structure 800 and its application to a tile 802 of imagery. In the example shown in FIG. 8A, the hierarchical spatial data structure 800 is a quadtree. A quadtree is a rooted tree structure where every internal node includes four child nodes. In the example shown, a root node R includes child nodes A, B, C and D. Each of the internal child nodes A and C has four child nodes. For example, internal child node A has four child nodes: $A_1$, $A_2$, $A_3$, and $A_4$. Likewise, internal child node C has four child nodes: $C_1$, $C_2$, $C_3$ and $C_4$. Following this pattern, the internal child node $A_4$ has four child nodes: $A_{4,1}$, $A_{4,2}$, $A_{4,3}$ and $A_{4,4}$. While only two levels of the quadtree data structure 800 are shown, the quadtree data structure 800 can have any desired number of levels depending on the application. The quadtree data structure 800 is a well-known hierarchical data structure that has a variety of useful properties. Quadtree data structures are described in Foley et al., "Computer Graphics: Principals and Practice Second Edition in C:" Addison-Wesley (1996) (see chapters 12 and 15), which is incorporated by reference herein in its entirety.

The quadtree data structure 800 is particularly well-suited for storing imagery and associated metadata. In the example shown, the root R of the quadtree data structure 800 can be mapped to tile 802, which is shown in FIG. 8B. The tile 802 can be generated as described elsewhere herein, and can also be generated as described in U.S. patent application Ser. No. 11/473,461 ("the '461 application"), entitled "Hierarchical Spatial Data Structure and 3D Index Data Versioning for Generating Packet Data," filed Jun. 22, 2006, the entire disclosure of which is hereby expressly incorporated by reference herein. The tile 802 can be further divided into four quadrants A, B, C, D, each of which can be mapped to child nodes A, B, C and D of the quadtree data structure 800. Each of the four quadrants A, B, C and D can be further divided into four quadrants and so forth. Thus, there can be a direct mapping between nodes in the quadtree data structure 800 and quadrants in the tile 802. In the example shown, the quadrants $A_{4,1}$, $A_{4,2}$, $A_{4,3}$, and $A_{4,4}$ in the tile 802 map to nodes $A_{4,1}$, $A_{4,2}$, $A_{4,3}$, and $A_{4,4}$, respectively, in the quadtree data structure 800. The nodes of the quadtree data structure 800 are referred to herein as "quadnodes."

Figure 9A:
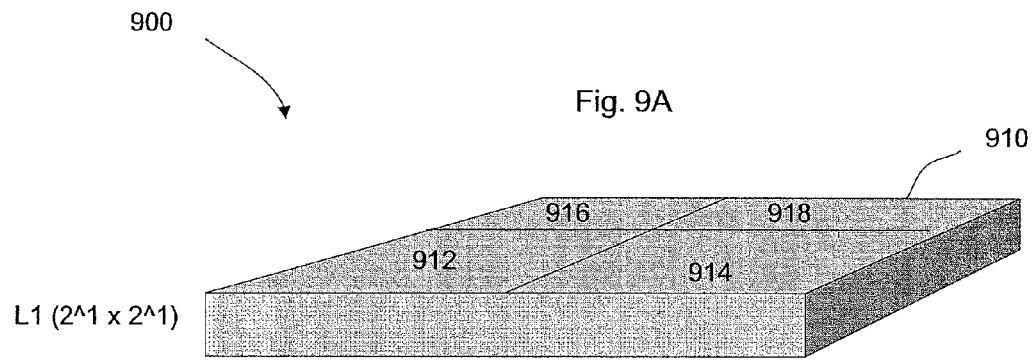
FIGS. 9A-C illustrate a quadtree hierarchical spatial data structure and tile generation in accordance with aspects of the present invention.
Figure 9B:
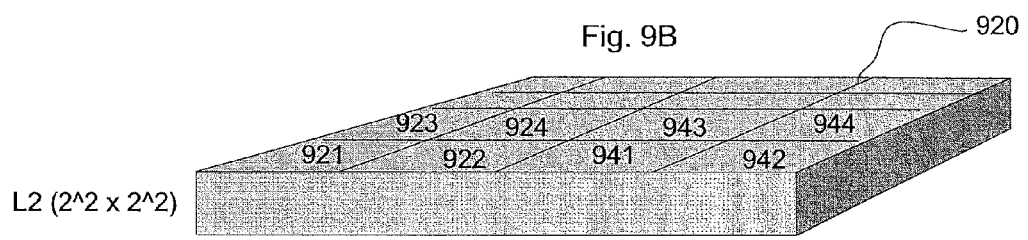
Figure 9C:
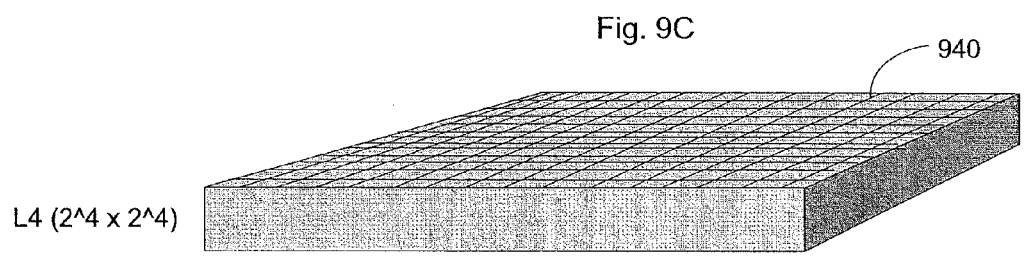

FIGS. 9A-C provide another example of the hierarchical quadtree architecture. As shown, for each level of detail, N, a portion of the Earth's surface 900 is divided into $2^N \times 2^N$ tiles. Thus, for example, a first level of detail LOD1, represented by block 910 in FIG. 9A, includes four tiles ($2^1 \times 2^1 = 2 \times 2 = 4$). These four tiles are represented in FIG. 9 as tiles 912, 914, 916, 918. Each tile has the possibility of being represented by four tiles at a finer level of the quadtree structure. Thus, for example, at a second level of detail LOD2 in FIG. 9B, block 920 includes 16 tiles, with 4 tiles for each of its 4 parent tiles 912, 914, 916, 918 of block 910. Tiles 921-924 are the children of tile 912, tiles 941-944 are the children of tile 914, and so on.

According to this quadtree structure, as the level of detail increases, a number of tiles covering a portion of the Earth's surface increases significantly. For example, at another level of detail LOD4, represented by block 940 in FIG. 9C, 256 tiles may be used ($2^4 \times 2^4 = 16 \times 16 = 256$). While only four levels of detail are shown in FIGS. 9A-C, it should be understood that any number of levels may be included in the quadtree hierarchy. For example, a finest level of detail available may occur at a much higher level, such as level 17, which would result in over 17 billion tiles.

The portion of the data structure for a particular tile at a particular level may be referred to as a "node" or a "quadnode." Tile imagery and metadata may be associated with quadnodes of a quadtree data structure. For example, for each node, there may be an associated list of dates of available historical imagery at that location and level. According to one example, the locations of the files that store the data for each quadnode can be stored in a master index table.

Due to storage, processing and other factors, creating and maintaining new databases can be resource and cost intensive. In some situations, an imagery database may already exist with a single tile for each region of interest. For instance, a particular tile may have been blended based solely on LOD and stored in the imagery database. It is possible that this particular tile has the same view as an image tile which would generated by the acquisition date-based processing disclosed herein. In that case, it is desirable to leverage the existing database to avoid duplicative storage of such tiles. Therefore, while a new database may include a set of new assets and/or tile images with predetermined acquisition dates, the existing database and the new database may be linked, (e.g., via a pointer added to an index table) indicating which database stores a given image tile. Additional data may be linked with the preexisting tile from the existing database to associate the particular tile with an acquisition date. Such linked databases would help to leverage any existing imagery database.

Figure 15A:
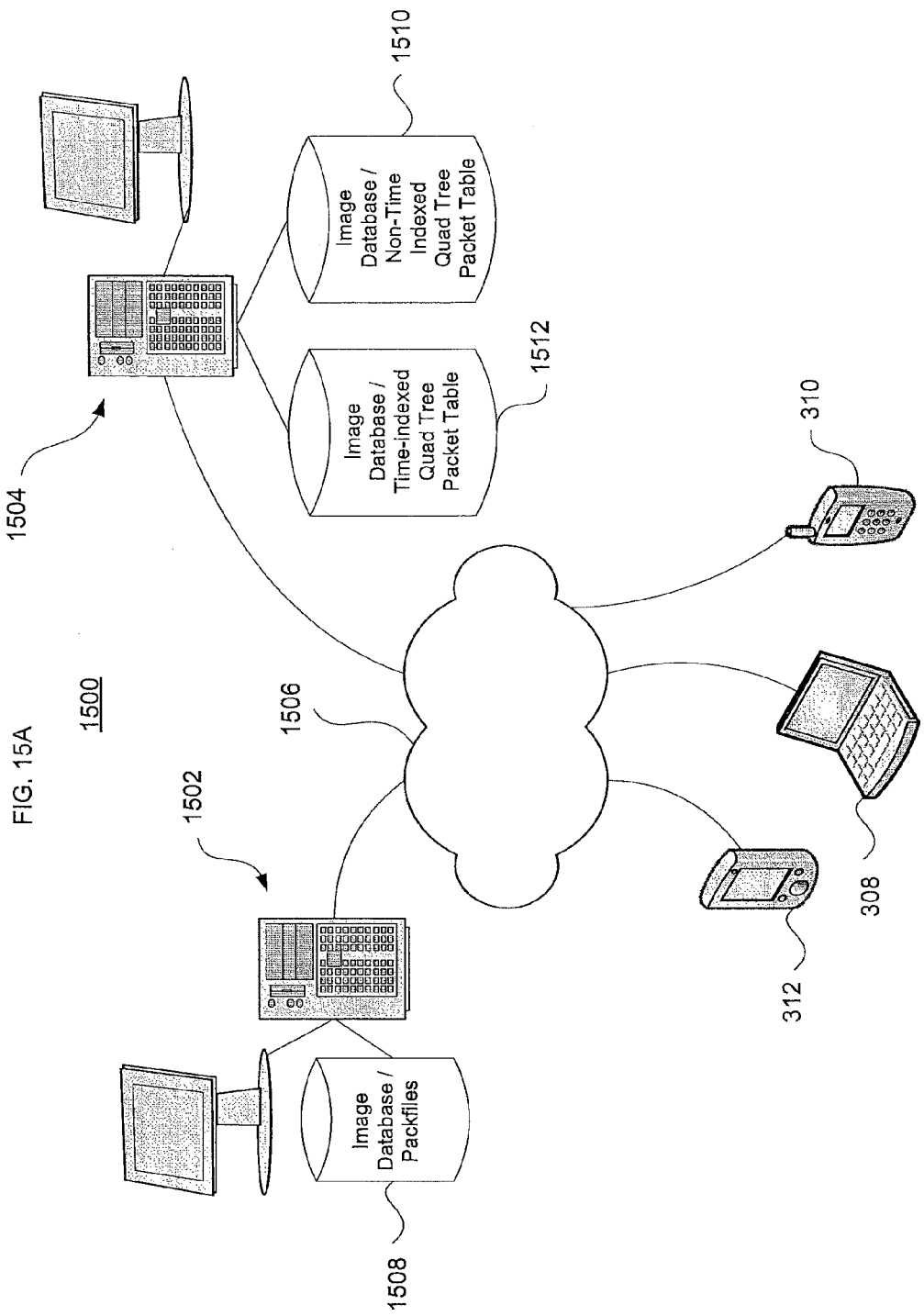
FIGS. 15A-B illustrate a distributed imagery architecture in accordance with aspects of the present invention.

One or more datacenters may store and maintain imagery data which is provided to client devices upon request. By way of example, a primary datacenter and one or more distributed datacenters may be provided. FIG. 15A illustrates one such distributed architecture 1500 including primary datacenter 1502 and distributed datacenter 1504 connected to a network 1506, which in turn may couple one or more user devices, e.g., devices 308, 310 and 312 of FIG. 3A. As shown, primary datacenter 1502 includes a database 1508, which may maintain image data and/or packfiles as will be explained in more detail below. The distributed datacenter 1504 may include one or more databases such as databases 1510 and 1512. These databases may store image-related data dependent upon different criteria, as will be explained in more detail below.

New images of the Earth's surface may be taken periodically and added to a database of images. Such may require the images to be processed, for example, to be associated with particular locations, times, and levels of detail. In order to speed up processing, blending is desirably performed at a server, e.g., server 304. Here, the image tiles for a region of interest may be stored in an imagery database such as database 332 of FIG. 3A. While it is possible to send some or all of the imagery database to a client device and have the client device perform acquisition time based blending, such processing is computationally intensive and better performance may result from having a server or multiple processing devices (e.g., operating in a parallel processing manner) perform such processing, including blending and/or compression, and transfer resultant image tiles based on a requested region of interest.

Figure 15B:
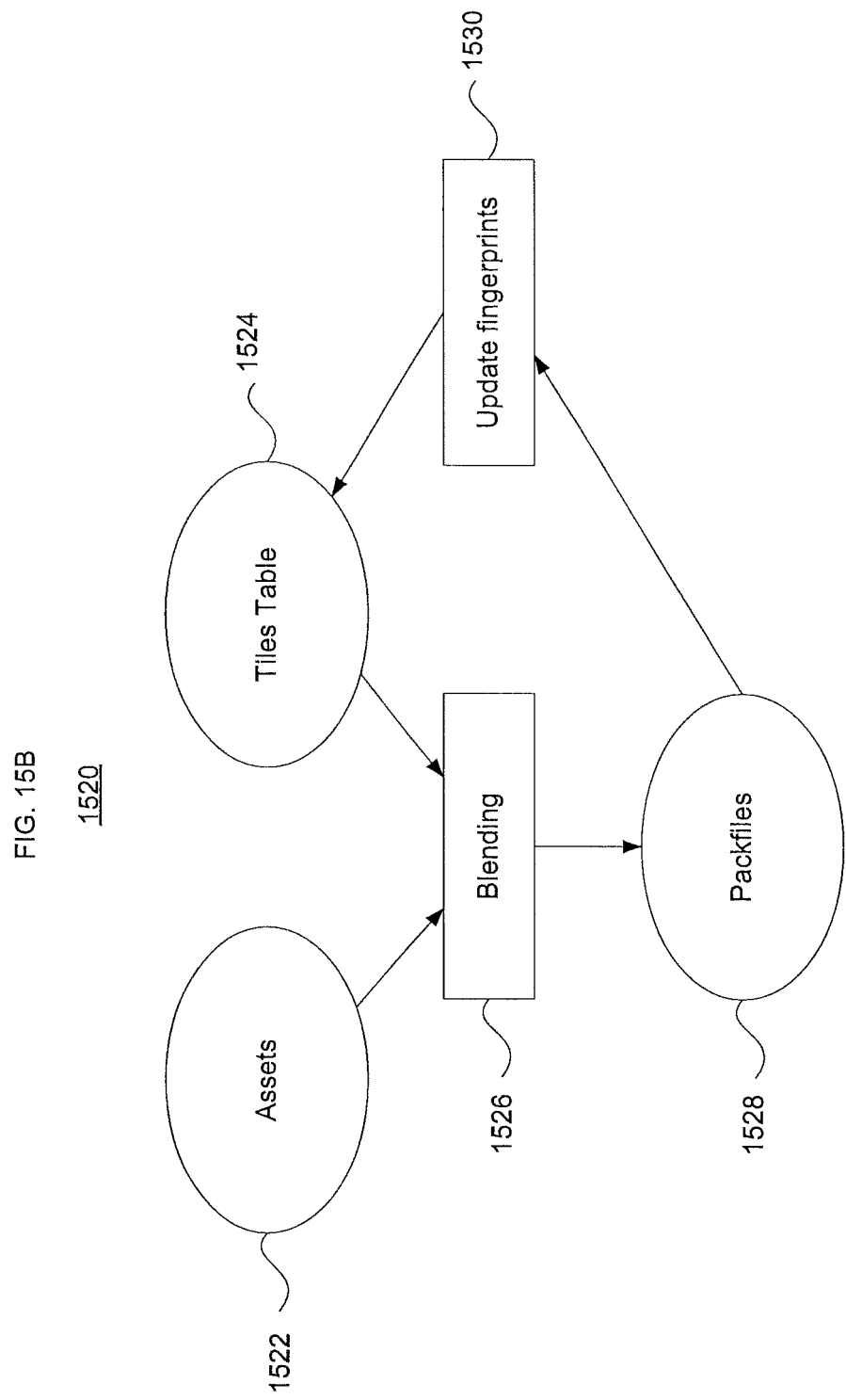

FIG. 15B illustrates a blending and updating scenario 1520 which incorporates assets 1522 and a tiles table 1524 for maintaining/organizing tiles. The assets and tiles table may be stored or otherwise maintained in database 1508 of the primary datacenter 1502. At blending block 1526 the assets and/or tiles table are blended as described herein. The tiles table may or may not include time-based information. The tiles table may be indexed by location and level of detail. In the case where some or all of the tiles include time-based information, the tiles table may also be indexed by date.

In one example, blending per block 1526 occurs in primary datacenter 1502. In this example each execution of the blending process, whether or not time-based information is employed, produces a version or "epoch." The resulting blends may be placed into packfiles 1528 for that version/epoch. Upon creation of the packfiles 1528, fingerprints associated with the tiles may be updated per block 1530. As used herein, a fingerprint is a hash of the information that is used to create a tile. The hash/fingerprint may be used to answer whether the tile being produced with the current assets and other parameters is the same as one that was previously produced.

Consider an example for a single location and LOD during the blending process. In this example, time-based assets may be employed in conjunction with existing non-time-based imagery. In accordance with an aspect of the invention, assets intersecting a given tile are sorted by date and are blending in order from oldest to newest. As each dated tile is processed, several fingerprints may be considered (if they exist). For instance, a non-time-based fingerprint from the tile table may represent a released non-time-based tile. A time-based fingerprint from the tile table may represent a released and dated tile. And a newly generated time-based fingerprint may be associated with the dated tile being processed. When a new fingerprint is generated for a dated tile undergoing processing and is compared to an existing tile table fingerprint, numerous possibilities may occur, as shown in the following table.

| Non-Time-Based Fingerprint | Time-Based Fingerprint | Action |
| --- | --- | --- |
| Not equal | Not equal | Blend |
| Not equal | Equal | Skip (1) |
| Equal | Not equal | Share |
| Equal | Equal | Share |
| Equal | Previously deleted or shared | Skip (2) |
| Not equal | Previously deleted or shared | Blend (3) |
| Previously released & deleted | Previously deleted or shared | Blend (4) |
| Previously released & deleted | Equal | Skip (1) |
| Previously released & deleted | Not equal | Blend |
|  | Doesn't exist | Blend |

Note
"(1)" in the table indicates that the tile already exists in a previous time-based version, cannot be shared with a non-time-based tile database, and does not need to be reblended.
Note
"(2)" in the table indicates that the tile has been previously shared, but no changes have been made to a non-time-based asset, so the tile can be skipped or re-shared.
Note
"(3)" in the table indicates that the tile was previously shared with the non-time-based tile database, but the non-time-based tile has been updated and can no longer be shared and thus is to be blended.
And note
"(4)" in the table indicates that a tile was previously deleted from the tile databases. In this case, when an "in-process" dated tile (e.g., a time-based tile currently being generated) has assets associated with it, then it should be blended. As shown in FIG. 15B, after a fingerprint is updated per block 1530, information regarding the updated fingerprint may be provided to the tile table 1524.

The packfiles 1528 formed as a result of blending per block 1526 may have one or more entries therein. A given entry in a packfile 1528 may contain a tile, an indication that a tile is shared with a database such as the non-time-based tile database, or a deletion marker indicating that the entry should be deleted. Each entry in a packfile 1528 may be dated when the packfile 1528 contains time-based data. Each entry in a specific packfile 1528 that is a tile may also contain a new/current fingerprint for that tile.

The packfiles 1528 may be sent to other datacenters, such as distributed datacenter 1504, for further processing. This may be done by issuing the packfiles on disk or other recording medium, or otherwise outputting the packfiles to distributed datacenters 1504. Alternatively, the primary datacenter 1502 may write tiles and/or other image-related data to the serving datacenter(s) 1504 without issuing packfiles.

Figure 10:
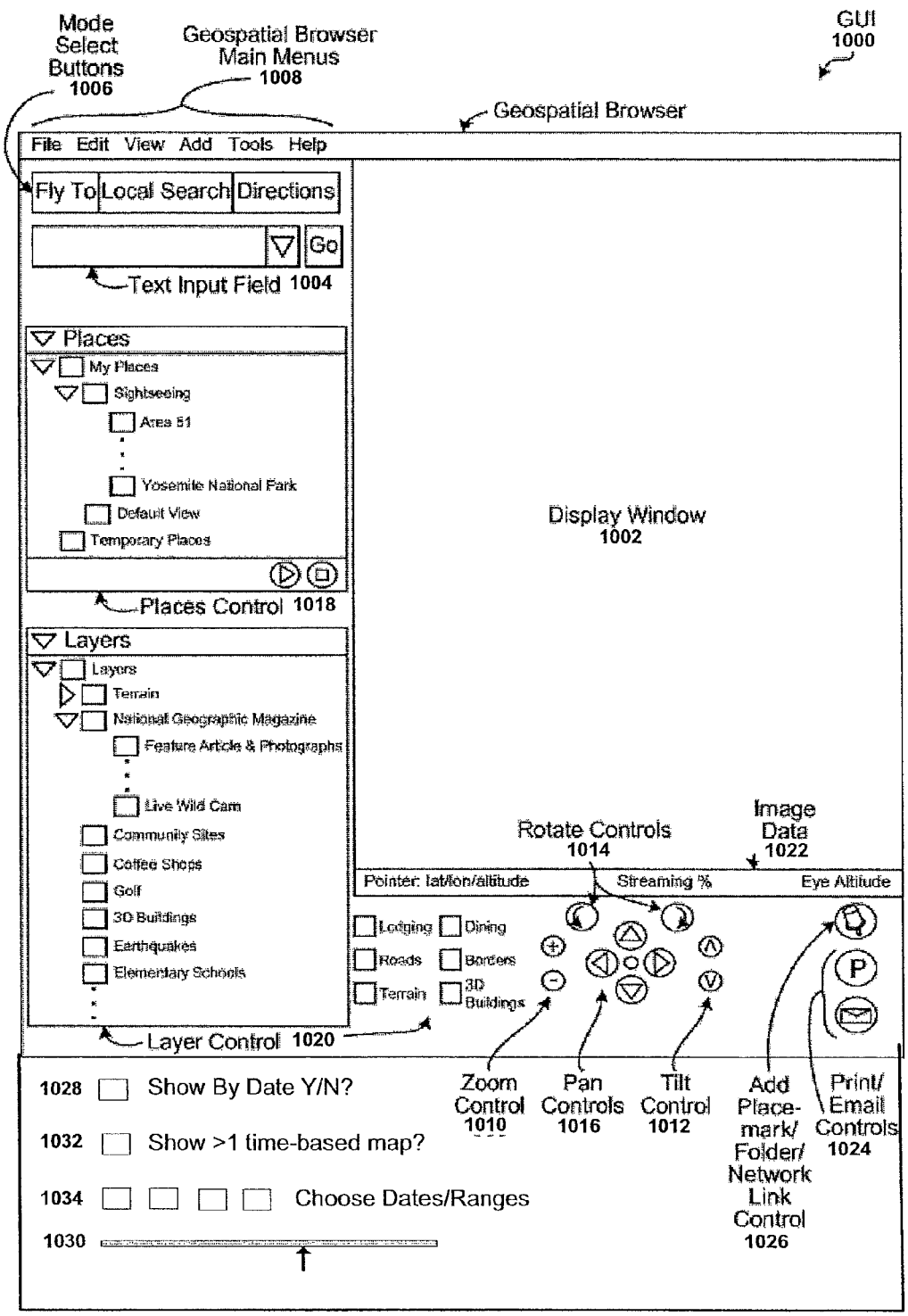
FIG. 10 illustrates a GUI for use in accordance with aspects of the present invention.

FIG. 10 illustrates one particular embodiment of a geospatial browser GUI 1000 for use in accordance with aspects of the present invention. The GUI geospatial browser 1000 includes a display window 1002 for displaying a 2D or 3D map, as well as a text input field 1004 for entering location information such as latitude and longitude, an address and/or zip code, or the name of a well-known site (e.g., "Lincoln Memorial" or "Area 51"). The GUI 1000 may include a number of modes in which it can operate, including "Fly To" mode, "Local Search" mode, and "Directions" mode, as shown by mode select buttons 1006, which is part of the geospatial browser main menu 1008. A discussion of the Fly To mode, Local Search mode and Directions mode may be found in the '049 application.

GUI 1000 may also include a zoom control 1010 for adjusting the viewing altitude, a tilt control 1012 for adjusting the viewing angle, rotation controls 1014 for rotating the view left and right, and/or a set of panning controls 1016 to view areas of the 2D or 3D map to the left, right, top or bottom of the display window.

GUI 1000 may also includes a places control 1018, which allows the user to organize saved data in a Places panel in a way similar to how a user would organize files and folders on a computer's hard drive. For example, the places control 1018 allows the user to create folders, reorder placemarks or folders, rename a placemark or folder, remove/delete a placemark or folder, and empty a folder's contents. Also, the user can select (e.g., check box or other such GUI control mechanism) various places designated in the places control 1018, and then select a "play" function button (lower right of places control 1020 panel) so that a virtual tour of those selected places may then be displayed in the window 1002. Stop and pause functions can also be provided to give the user more control over a virtual tour.

GUI 1000 may also includes the layer control 1020, which provides a variety of data points of geographic interest (e.g., points of interest, as well as map, road, terrain, and building data) that a user can select to display over the viewing area. In the example shown in FIG. 10, exemplary commonly used layers are available on the Navigation panel (e.g., Lodging, Dining, Roads, Boarders, Terrain, and 3D Buildings) and a full list of layers is available in the Layers panel (e.g., National Geographic Magazine articles relevant to a particular area, Golf courses/ranges, Coffee Shops, Community Sites, earthquake epicenters, etc).

GUI 1000 of this example may also display image data 1022 in the lower portion of the display window 1002, including pointer/cursor coordinates (e.g., lat/lon/altitude), streaming percentage completion, and eye altitude (e.g., feet). The GUI 1000 may further includes print and email controls 1024 (so as to allow for printing and emailing of locations and/or images). Also, the GUI 1000 optionally includes an add placemark/folder/network link control 1026, which allows the user to create or otherwise add new placemarks, folders, and/or network links.

The geospatial browser main menus 1008 may include the File menu (e.g., functions such as Open, Save, Save As, Email/Email View, Share with Online Community, Print, Logout), Edit (e.g., includes functions such as Find in Places, Find Next, Find Prey, Copy, Snapshot View, Past Delete, Rename, Refresh, Apply Style Template, Delete Content, Save to My Places, Clear Search History, and Properties), View (e.g., includes functions and selectable display features such as Full Screen, View Size, Compass, Status Bar, Lat/Lon Grid, Overview Map, and Play Tour), Add (e.g., includes functions to allow the addition of Placemarks, Folders, Image Overlays, and Network Links), Tools (e.g., includes selectable tools such as Navigation panel, Places panel, Layers panel, Measuring tool, and Web Search panel), and Help (e.g., includes access to online help center and other informative sources). Note that the add placemark/folder/network link control 1026 can be configured to provide menu options that correspond to the options in the Add menu of the geospatial browser main menus 1008. Further note that various places and layers of the Places and Layers panels can be expanded (or condensed) to show additional (or fewer) sub-places and sub-layers (e.g., click GUI arrow pointing at place/layer label to expand or show sub-places/sub-layers, or click GUI arrow pointing down to condense or hide sub-places/sub-layers).

In accordance with aspects of the present invention, the GUI 1000 also includes date-related options. For instance, one or more actuators/selectors 1028 may enable the user to select or deselect time-based imagery display. If selected, the user may employ an actuator such as slider 1030 to set a date of interest for the map. Another actuator 1032 may enable the user to choose to view multiple maps in a side by side or tiled arrangement, wherein the different maps show the same region of interest at different points in time. In this case, the user may employ actuator(s) 1034 to select particular dates to map, or may use text input field 1004 to type dates or a date range. In an alternative, zoom control 1010 or another control may enable the user to "zoom" or "pan" between maps for different timeframes depending upon whether time-based imagery display has been enabled via actuator 1028.

Numerous GUI configurations and underlying functionalities will be apparent in light of this disclosure, and the present invention is not intended to be limited to any one particular configuration. The displayed 2D or 3D maps can be manipulated using the GUI 1000. The GUI 1000 can be used to reposition the current map view, for example, by clicking and dragging in the display window 1002. A user may also select a geographical location or time by double-clicking on it within the display window 1002.

When a user selects a time-based map with GUI 1000, the user may be provided with information pertaining to the dates or range of dates for which imagery is available. For instance, the user may select a region of interest (e.g., San Francisco), and a query may be generated in display window 1002 informing the user that maps are available for the following dates: 1980, 1990, 2000, 2007 and 2008. The user is then given the option of selecting one or more maps based on dates as discussed herein. Alternatively, the user may choose to view a map without reference to a particular date, e.g., showing merely the highest resolution available.

In the case where the user desires to view a time-based map, data may be passed to the client device concerning which image tiles are available for specific dates. The client device will then be able to request an image tile(s) in accordance with a date(s) selected by the user. Tiles may be provided based on the resolution as chosen by the user (if any).

Upon request, an imagery server at a distributed datacenter provides hierarchical "table of contents" data, quadtree packets, to a client device. When viewing a region of the Earth, the client device requests the quadtree packets for that region. For each tile in view, the quadtree packet indicates which tiles have imagery available, as well as other layers like terrain and vector data. This enables the client device to know exactly which requests for imagery to make. Each packet may also contain the table of contents data for several hundred tiles. This reduces the number of round trips required to get the table of contents data. The entry for each tile in a quadtree packet is referred to as a quadnode because it is a node in the quadtree.

In the time-base imagery database, the data in each quadnode may include a list of times for which blended images are available for that tile. This allows the client device to minimize its requests for imagery. Thus, when the user of the client device selects a new time in the interface, the client device need only request images where the new time corresponds to an image different from the one it is already displaying.

For example, a client device operable to handle time-based imagery may request quadtree packets for the current location and level from a server based on the current view of the Earth. Using the date information in the quadtree nodes, the client device may then request the appropriate dated tiles for the location and level from the server. If any needed tile is shared the client device may redirect the request to a non-time-based server instead. Tiles may be cached in the client device on a per-server basis, so requests for shared tiles can be satisfied by the non-time-based server cache. The client cache may also be indexed by date for time-based tiles, so requests for dated tiles in the same location and level can be satisfied by the time-based server cache.

FIG. 11A provides a screenshot of a GUI 1100 according to an aspect of the invention. As shown, the GUI 1100 includes many of the same features as the GUI 1000, such as mode select buttons 1106, a text input field 1004, and a display window 1102. The display window 1102 provides a viewing field for viewing a portion of the Earth's surface. For example, an address or name of a location may be entered in the text input field 1104, and a satellite image of that area may be provided in the display window 1102. As shown in FIG. 11A, the display window provides an overhead image of Rod laver Arena in Melbourne, Australia. The viewing field covering Rod Laver Arena may be altered using tilt/rotate controls 1112, pan control 1116, and/or zoom control 1110. Historical images of this area may also be provided, for example, using slider 1130. An exploded view of slider 1130 is provided in FIG. 11B.

As shown in FIG. 11B, the slider 1130 may include a range 1152 of available images. In this example, the range 1152 provides imagery from 1962 through 2009. Along this range 1152 are a series of tick marks 1154. These tick marks 1154 indicate particular dates for which different images are available. For example, a first tick mark 1154 along the range 1152 may be associated with imagery from 1963, while a next tick mark 1154 is associated with imagery from 1972, and a next tick mark is associated with imagery from 1989, and so on. Time marker 1145 may be moved along the range 1152 to select an available image for viewing. For example, as shown in FIG. 11B, the time marker 1145 has been moved back in time to November, 2002 to display an associated image. The time marker 1145 may similarly be moved to any of the tick marks 1145 to view the images associated with various time periods.

The slider 1130 also includes several features to facilitate viewing of historical imagery. Sequence buttons 1140 enable a user to step forward or backward from one tick mark 1154 to the next along the range 1152. They may also enable a user to play an animation of a sequence, such as following sequential GPS tracks that occurred within a specified time period. Range marker 1142 enables a user to define a time range of data to be displayed. For example, a user may slide the range marker 1142 to the right to decrease the time range, or to the left to increase it. Zoom buttons 1144 enable a user to shorten or lengthen the date range covered by the timeline. For example, more recent periods in the timeline may include a greater number of tick marks 1154, as shown in FIG. 11B. Between approximately 2002 and 2009, a number of different images may be available. To view the availability of images during this time period more easily, a user may zoom in on this date range using zoom buttons 1144. When finished, the user may zoom out of this range also using zoom buttons 1144.

Options button 1143 may enable a user to change various settings related to the images provided. For example, the user may set the time for the start and end of the timeline. The user may also change the way time is displayed in the GUI 1100. For example, the user may set the time zone to Coordinated Universal Time, the time zone on the user's computer, or any other selected time zone. Further, the user may modify any animations, for example, by changing the playback speed and/or looping the animation continuously.

In some circumstances, when a particular region is displayed in the viewing field 1102 of the GUI 1100 and a particular time along the slider 1130 is selected, the available imagery may not cover the entire viewing field 1102. For example, images may be available for some nodes at a specified time and not for other nodes for that same time. Accordingly, one aspect of the present invention provides a map generation process which supplements the available imagery to accommodate for the unavailable imagery.

An exemplary map generation process 1200 is described below with regard to FIG. 12. As shown in block 1202, the client device (or server) receives a request from a user for an image associated with a geographical location at a point in time prior to the time of the request. The request may also include a specified level of detail for the image. For example, the user may use the zoom controls 1110 to focus in on the viewing field at a particular level of detail, and may move time marker 1145 along the slider 1130 to view a historical time period.

As shown in block 1204, one or more image tiles are obtained which correspond to the time-based request. The image tiles which are obtained are selected from a number of image tiles which include image tiles associated with images captured before and after the requested point in time.

In step 1206, it is determined whether all of the image tiles needed to fill the viewing field have been obtained. If so, the process proceeds to step 1208, where an the requested image is provided to the client. However, in some instances all of the image tiles needed to fill the viewing field may not be available. For example, some quadnodes may not have image tiles at a particular level of detail for a selected location at a particular date in history for which the other nodes have real tiles. In such an instance where not all of the image tiles were obtained, the process proceeds to step 1210.

In step 1210, the server searches parent quadnodes for coarse tiles to substitute for the missing tiles. For example, tiles associated with the same location and time, but for a different level of detail (e.g., a lower coarser resolution) may be searched. According to one aspect, the search would begin with the parent quadnodes of the missing tiles.

In step 1212, it is determined whether coarse tiles have been located for all of the missing tiles. If not all substitute tiles have been located, the process may return to step 1210 where further quadnodes are searched. For example, the search may continue up the quadtree hierarchy to progressively lower levels of detail until a coarse tile is located. When such a coarse tile is located, the process proceeds to step 1214. Thus, the located tile may be one or more LODs coarser than the missing tile.

In step 1214, the coarse tile in the parent quadnode is accessed to provide imagery for the requested time, location, and level of detail. The coarse tile, however, is a different level of detail than the other tiles included in the viewing field 1102. Accordingly, the coarse tile is magnified to the same level of magnification as the other tiles in the viewing field. Because the coarse tile is a lower resolution, the image associated with the coarse tile may be blurry as compared to the real tiles in the viewing field 1102. In step 1216, the image including the magnified coarse tiles may be provided to the client. The requested image may thus be provided to the user, for example, in the display window 1102 of the GUI 1100.

It should be understood that a determination that a coarser tile is needed to supplement real tiles need not be made in response to a request by a user or by the client device. For example, it may be determined during the blending process (e.g., discussed above in connection with FIGS. 2 and 4-7) that a coarse asset is needed to cover a particular tile. If no real assets for a particular date, location, and resolution are available to completely cover the tile, a magnified coarser asset for that location may be blended with any real assets to generate a blended tile.

Further to the processing and blending, tiles may be indexed and stored. For example, a list of tile dates may be stored for each quadnode and may be accessed by the client. These tile dates may also be output by the client as tick marks 1154 in the slider 1130.

Figure 13A:
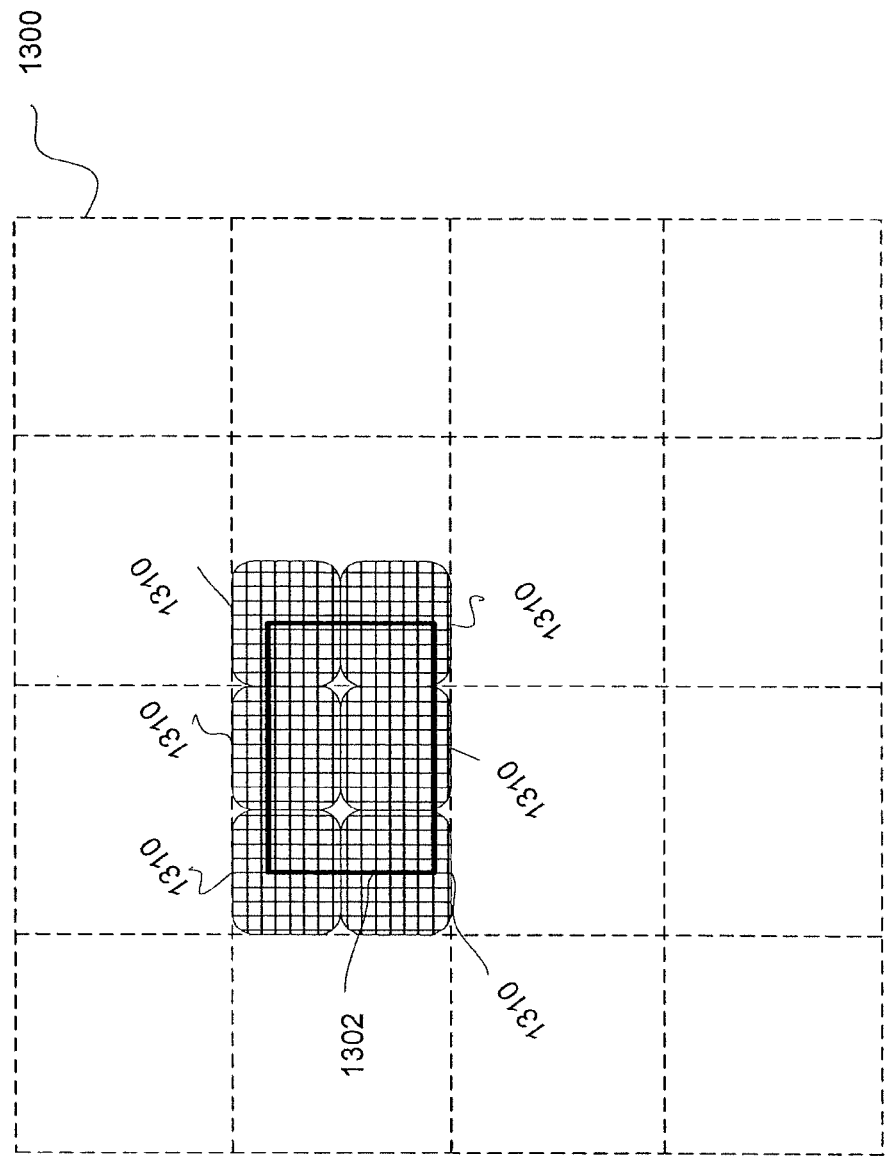
FIGS. 13A-13B illustrate available quadnodes and tiles for a level of detail at a particular time based on a selected viewing field in accordance with aspects of the present invention.

FIGS. 13A-B and 14A-B illustrate obtaining image tiles associated with a selected time, location, and level of detail as discussed above. FIG. 13A shows a grid 1300 covering a portion of the Earth's surface. Within the grid 1300, a viewing field 1302 is selected. The viewing field 1302 may be defined by a user, for example, by searching for a location. The user also specifies a time period, for example, using the slider 1130. Additionally, the user may use the pan controls 1116 and zoom controls 1110 to further define the viewing field 1302. The viewing field 1302 may determine the image resolution to render, and a set of quadtree nodes 1311, 1312, 1313, 1314, 1315, 1316 associated with the viewing field 1302 may thus be identified.

Figure 13B:
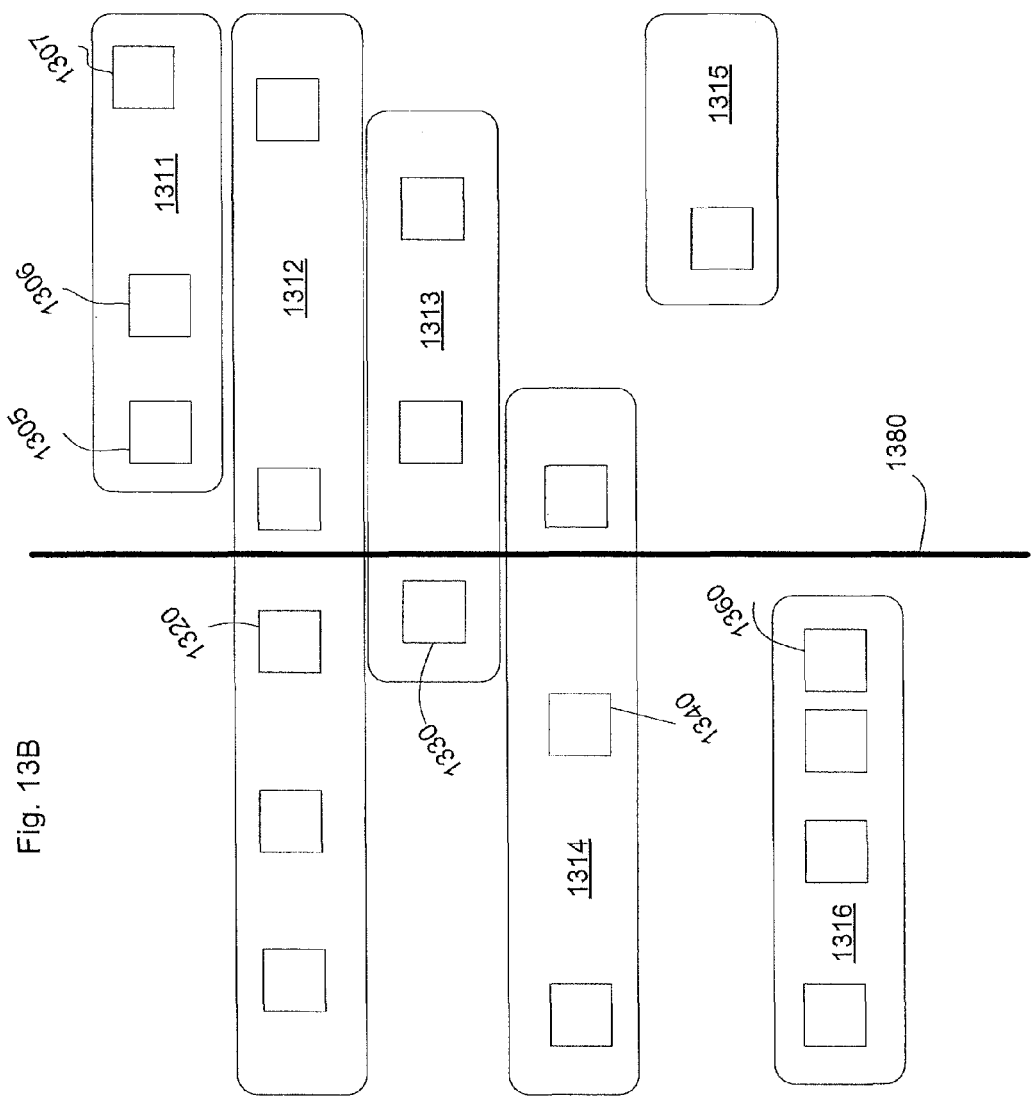

In FIG. 13B, tiles associated with the specified time period are selected for each quadnode 1311-1316. These tiles may be used as textures for the area to be viewed. For example, the tiles may be associated with images to be displayed of the selected location. As shown, the tiles for each quadnode are arranged in date order. For example, an oldest tile of quadnode 1311 may be tile 1305, followed by tile 1306, and a most recent tile may be tile 1307. The specified time period is represented by date line 1380.

For each of quadnodes 1312, 1313, 1314, and 1316, a most recent tile prior to the date line 1380 is selected. Accordingly, tile 1320 is selected for quadnode 1312, tile 1330 is selected for quadnode 1313, tile 1340 is selected for quadnode 1314, and tile 1360 is selected for quadnode 1316. However, quadnodes 1311 and 1315 do not have any real tiles which predate the selected time period. Accordingly, as described above with respect to FIG. 12, parents of quadnodes 1311 and 1315 may be searched to find a coarser tile that predates the selected time period.

Figure 14B:
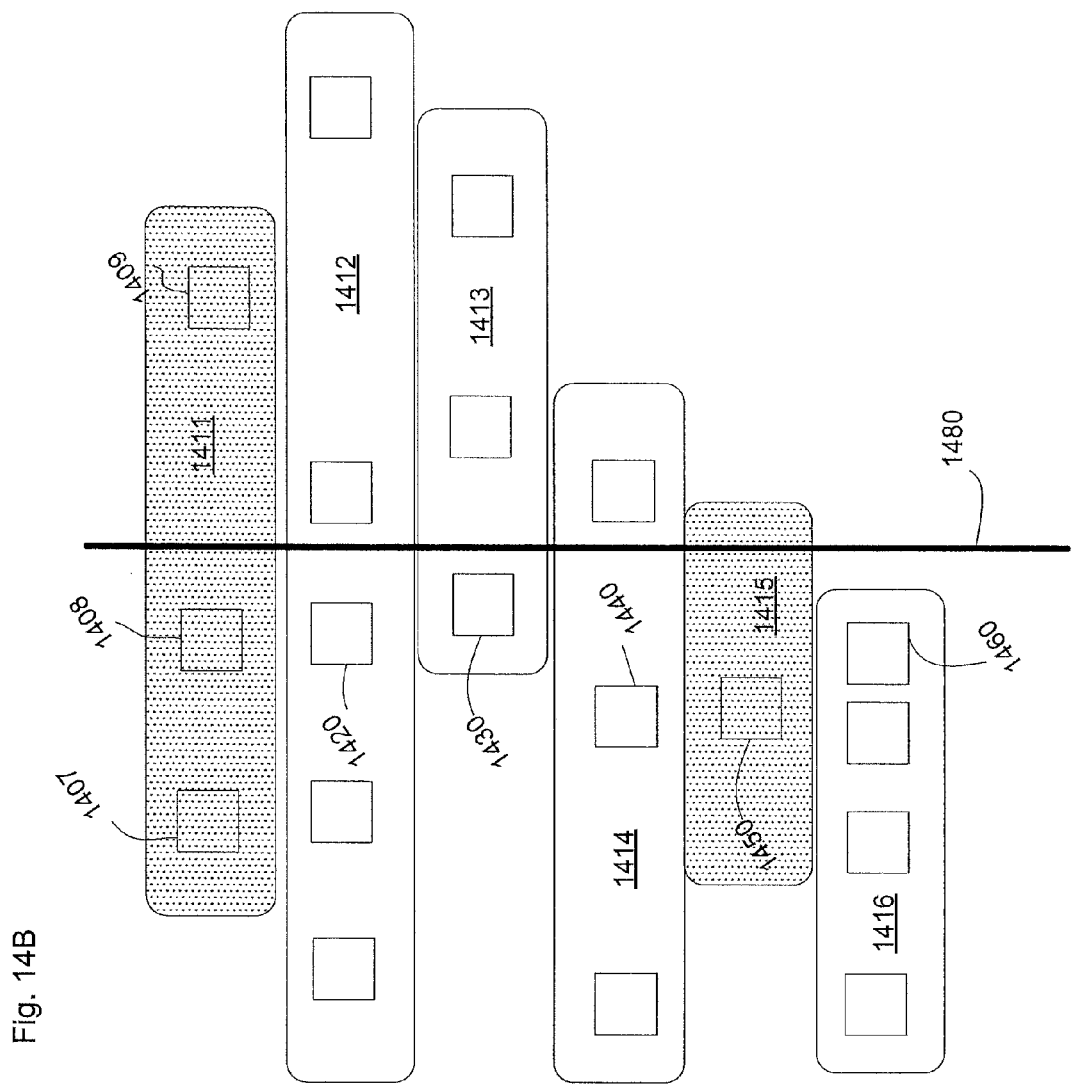

FIG. 14A shows the selected viewing field 1402 on the grid 1400, where nodes 1412, 1413, 1414, 1416 for the determined level of detail are identified. Nodes 1411 and 1415 from higher in the quadtree hierarchy are also included. For example, these nodes 1411, 1415 may be parents, grandparents, or higher of nodes 1311, 1315. As shown in FIG. 14B, these higher level nodes 1411, 1415 includes tiles 1408, 1450 prior to the selected date represented by date line 1480. Accordingly, these image tiles 1408, 1450 may be used as substitutes for the tiles missing in quadnodes 1311, 1315. For example, tiles 1408, 1450 may be magnified to a resolution of the real tiles 1420, 1430, 1440, 1460 used as textures for the viewing field 1402 and may supplement those real tiles 1420, 1430, 1440, 1460.

According to one aspect of the invention, a quadnode may store two lists of dates—real tile dates and coarse tile dates. For example, the server may consider each date for which imagery is available at a particular resolution, and output a real tile and an indicator to the client. The client may read this indicator and in turn output a tick mark 1154 on the slider for that date. The server may then consider dates for which imagery is only available at a coarser level of detail, and output a coarse tile marker, indicating that imagery is available at coarse levels of detail.

The client may read the coarse tile marker and add a corresponding tick mark 1154 to the slider. The coarse tile tick mark is not necessarily distinguishable from the real tile tick mark. Accordingly, when an image is requested at a particular level of detail, historical dates for which real and coarse imagery is available will be provided. In addition to storing the tile dates for a quadnode, dates associated with coarser tiles may also be stored for each quadnode. For example, quadnode 1311, in addition to storing a list of real tiles 1305-1307 and their associated dates, may also store a list of coarser tiles 1407, 1408, 1409 and their associated dates. The client may also output the tile dates for the coarse tiles 1407-1409 as tick marks 1154 in the slider 1130. The tick marks 1152 corresponding to the coarse tile dates may not be distinguishable from the tick marks 1152 corresponding to the fine tile dates. In this regard, a user viewing assets at a first level of detail may be provided with an available range of dates in history to view historical images of the same location. If the user transitions to a finer level of detail, the user may be provided with the same range of dates in history to the view historical images at finer resolution. At the finer resolution, however, some portions of the historical image may appear blurry as compared to other portions if the coarse tiles were needed in the viewing field.

Magnifying coarse assets to match assets of a higher resolution could take up a lot of storage space and bandwidth if these magnified coarse assets were stored separately in a server database. Accordingly, references to the coarse tiles may be stored in the quadtree packet for a finer resolution level, as opposed to separately storing the magnified coarse tiles themselves. If a date corresponding to the coarse tile is requested, the client may find the appropriate tile at the coarse level and magnify it for display.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Furthermore, while particular processes are shown in a specific order in the appended drawings, such processes are not limited to any particular order unless such order is expressly set forth herein.

The invention claimed is:

1. A method for displaying available dates associated with historical imagery of a specified location, comprising:

determining, using one or more computing devices, a first set of dates for which real tiles associated with a specified location and a first level of detail exist;

determining, using the one or more computing devices, a second set of dates for which coarse tiles associated with the specified location and a second coarser level of detail exist, wherein the second coarser level of detail is coarser than the first level of detail;

providing for display, using the one or more computing devices, through a user interface the first set of dates and the second set of dates;

receiving, using the one or more computing devices, input from a user requesting imagery associated with the specified location, one of the first or second sets of dates, and a specified level of detail;

searching, using the one or more computing devices, a database for real image tiles associated with the requested imagery;

determining, using the one or more computing devices, whether all real image tiles needed to fill a viewing field have been obtained;

if it is determined that all real image tiles needed to fill the viewing field have not been obtained:
  searching, using the one or more computing devices, the database for coarse image tiles associated with the requested imagery to fill a remainder of the viewing field; and
  magnifying, using the one or more computing devices, the coarse image tiles based on the specified level of detail; and providing for display, using the one or more computing devices, the image tiles associated with the requested imagery on a display.

2. The method of claim 1, further comprising requesting the image tiles associated with the requested imagery from a server.

3. The method of claim 1, wherein if the input from the user requests imagery associated with a given one of the first set of dates, the searching for image tiles comprises identifying for each quadnode a most recent tile prior to the given date.

4. The method of claim 1, wherein if the input from the user requests imagery associated with a given one of the second set of dates, the searching for image tiles further comprises:
  identifying parent nodes of quadnodes associated with the requested imagery; and
  for each parent node, identifying a most recent tile prior to the given date.

5. The method of claim 4, further comprising magnifying the most recent tiles identified in the parent nodes.

6. The method of claim 1, wherein the viewing field is set by the user, and wherein the level of detail requested by the user is determined using the viewing field.

7. The method of claim 1, wherein providing for display the first set of dates and the second set of dates comprises:
  providing a range of dates for which historical imagery is available; and
  providing markers in the range, the markers corresponding to the first set of dates and the second set of dates.

8. A client device for displaying available dates associated with historical imagery of a specified location, the client device being electronically coupled to a server, the client device comprising a processor operable to:
  determine a first set of dates for which real tiles associated with a specified location and a first level of detail exist;
  determine a second set of dates for which coarse tiles associated with the specified location and a second coarser level of detail exist, wherein the second coarser level of detail is coarser than the first level of detail;
  display through a user interface the first set of dates and the second set of dates;
  receive input from a user requesting imagery associated with the specified location, one of the first or second sets of dates, and a specified level of detail;
  search for real image tiles associated with the requested imagery;
  determine whether all real image tiles needed to fill a viewing field have been obtained;
  if it is determined that all real image tiles needed to fill the viewing field have not been obtained:
    search the database for coarse image tiles associated with the requested imagery to fill a remainder of the viewing field; and
    magnify the coarse image tiles based on the specified level of detail; and
  display the image tiles associated with the requested imagery.

9. The client device of claim 8, wherein if the input from the user requests imagery associated with one of the first set of dates, the search for image tiles comprises identifying for each quadnode a most recent tile prior to the date.

10. The client device of claim 8, wherein if the input from the user requests imagery associated with one of the second set of dates, the search for image tiles further comprises:
  identifying parent nodes of quadnodes associated with the requested imagery; and
  for each parent node, identifying a most recent tile prior to the date.

11. The client device of claim 10, wherein the client device is further operable to magnify the most recent tiles identified in the parent nodes.

12. The client device of claim 8, wherein the client device is further operable to:
  receive input from the user setting the viewing field; and
  determine the level of detail requested by the user using the viewing field.

13. The client device of claim 8, wherein displaying through the user interface the first set of dates and the second set of dates comprises:
  providing a range of dates for which historical imagery is available; and
  providing markers in the range, the markers corresponding to the first set of dates and the second set of dates.

14. A system for displaying available dates associated with historical imagery of a specified location, comprising:
  a memory storing image tiles, the image tiles including at least one of real tiles and coarse tiles; and
  one or more processors in communication with the memory, the one or more processors to:
    determine a first set of dates for which real tiles associated with a specified location and a first level of detail exist;
    determine a second set of dates for which coarse tiles associated with the specified location and a second coarser level of detail exist, wherein the second coarser level of detail is coarser than the first level of detail;
    provide for display through a user interface the first set of dates and the second set of dates;
    receive input requesting imagery associated with the specified location, one of the first or second sets of dates, and a specified level of detail;
    search the memory for real image tiles associated with the requested imagery;
    determine whether all real image tiles needed to fill a viewing field have been obtained;
    if it is determined that all real image tiles needed to fill the viewing field have not been obtained:
      search the database for coarse image tiles associated with the requested imagery to fill a remainder of the viewing field; and
      magnify the coarse image tiles based on the specified level of detail; and
    provide for display the image tiles associated with the requested imagery on a display.

15. The system of claim 14, wherein the processor further identifies for each quadnode a most recent tile prior to the given date, if the input requests imagery associated with a given one of the first set of dates.

16. The system of claim 14, wherein, if the input requests imagery associated with a given one of the second set of dates, the processor further:
- identifies parent nodes of quadnodes associated with the requested imagery; and
- for each parent node, identifies a most recent tile prior to the given date.

17. The system of claim 16, wherein the processor further magnifies the most recent tiles identified in the parent nodes.

18. The system of claim 14, wherein providing for display the first set of dates and the second set of dates comprises:
- providing a range of dates for which historical imagery is available; and
- providing markers in the range, the markers corresponding to the first set of dates and the second set of dates.

19. The system of claim 14, further comprising receiving input setting the viewing field, and determining the specified level of detail using the viewing field.

* * * * *